(12) United States Patent
Hamrin et al.

(10) Patent No.: US 11,047,464 B2
(45) Date of Patent: Jun. 29, 2021

(54) DIFFERENTIAL WITH BI-DIRECTIONAL OVERRUNNING CLUTCH

(71) Applicant: TEAM Industries, Inc., Bagley, MN (US)

(72) Inventors: John Edward Hamrin, Bemidji, MN (US); Jordan Murphy, Wauwatosa, WI (US); Isaac Landrus, Park Rapids, MN (US); Brian Thomas Wolf, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 16/793,849

(22) Filed: Feb. 18, 2020

(65) Prior Publication Data
US 2020/0263775 A1    Aug. 20, 2020

Related U.S. Application Data

(60) Provisional application No. 62/927,349, filed on Oct. 29, 2019, provisional application No. 62/808,270, filed on Feb. 20, 2019.

(51) Int. Cl.
*F16H 48/34* (2012.01)
*F16H 48/08* (2006.01)
(Continued)

(52) U.S. Cl.
CPC ............. *F16H 48/34* (2013.01); *F16H 48/08* (2013.01); *B60K 17/3462* (2013.01); *F16H 2048/423* (2013.01)

(58) Field of Classification Search
CPC .... F16H 48/08; F16H 48/34; F16H 2048/423; B60K 17/3462
(Continued)

(56) References Cited

U.S. PATENT DOCUMENTS 1,823,389 A    9/1931 Lavaud
3,055,471 A    9/1962 Warn et al.
(Continued)

FOREIGN PATENT DOCUMENTS

CA    2904602 C    2/2018
DE    430321 C    6/1926
(Continued)

OTHER PUBLICATIONS

"Auto Locking Front Drive System (Differential) for On-Demand Four Wheel Drive", at least as early as Feb. 9, 2019, p. 1.
(Continued)

*Primary Examiner* — Leslie A Nicholson, III

(74) *Attorney, Agent, or Firm* — Fogg & Powers LLC

(57) ABSTRACT

A differential with an overrunning clutch (ORC) assembly is provided. The differential includes a first plain bearing end cap with an interior surface that forms a plain bearing interface with an outer surface of a first side hub. The first plain bearing end cap further has a first outer surface portion that engages a first end portion of a roller cage assembly. A second plain bearing end cap with an interior surface that forms a plain bearing interface with an outer surface of the second side hub is also included. The second plain bearing end cap further has a first outer surface portion that engages a second end portion of the roller cage assembly. The (ORC) assembly selectively engages the roller cage assembly during an ORC condition to selectively couple torque between a ring gear and the first and second side hubs.

20 Claims, 27 Drawing Sheets

(51) Int. Cl.
*B60K 17/346* (2006.01)
*F16H 48/42* (2012.01)

(58) Field of Classification Search
USPC .......................................................... 475/234
See application file for complete search history.

(56) References Cited

U.S. PATENT DOCUMENTS

| | | | |
|---|---|---|---|
| 3,300,002 | A | 1/1967 | Roper |
| 3,788,435 | A | 1/1974 | Prueter |
| 4,124,085 | A | 11/1978 | Fogelberg |
| 5,025,902 | A | 6/1991 | Imai et al. |
| 5,036,939 | A | 8/1991 | Johnson et al. |
| 5,971,123 | A | 10/1999 | Ochab et al. |
| 6,132,332 | A | 10/2000 | Yasui |
| RE38,012 | E | 3/2003 | Ochab et al. |
| 6,557,677 | B2 | 5/2003 | Peura |
| 6,622,837 | B2 | 9/2003 | Ochab et al. |
| 6,629,590 | B2 | 10/2003 | Ochab et al. |
| 6,722,484 | B2 * | 4/2004 | Ochab ............... F16D 21/08 192/48.92 |
| 7,410,042 | B2 | 8/2008 | Ochab et al. |
| 7,490,708 | B2 | 2/2009 | Irikura et al. |
| 7,493,998 | B2 | 2/2009 | Irikura et al. |
| 7,559,390 | B2 | 7/2009 | Marsh et al. |
| 7,690,469 | B2 | 4/2010 | Irikura et al. |
| 7,938,041 | B1 | 5/2011 | Shiigi et al. |
| 8,312,792 | B1 | 11/2012 | Kochidomari et al. |
| 8,365,636 | B2 | 2/2013 | Irikura et al. |
| 8,840,514 | B1 * | 9/2014 | Knickerbocker ..... F16D 41/088 475/220 |
| 8,857,294 | B2 | 10/2014 | Brewer et al. |
| 8,857,589 | B2 | 10/2014 | Heath et al. |
| 8,919,513 | B2 | 12/2014 | Heath et al. |
| 9,022,195 | B2 * | 5/2015 | Heath ............... F16H 48/16 192/48.92 |
| 9,272,620 | B2 | 3/2016 | Knickerbocker et al. |
| 9,360,059 | B2 | 6/2016 | Palmer et al. |
| 9,719,567 | B2 | 8/2017 | Lawrence et al. |
| 9,856,930 | B2 | 1/2018 | Heath et al. |
| 10,150,369 | B2 | 12/2018 | Thornton et al. |
| 2002/0125095 | A1 | 9/2002 | Ochab et al. |
| 2002/0125097 | A1 | 9/2002 | Ochab et al. |
| 2003/0000796 | A1 | 1/2003 | Kawai et al. |
| 2006/0254382 | A1 | 11/2006 | Ebihara |
| 2006/0266611 | A1 | 11/2006 | Updyke et al. |
| 2007/0170029 | A1 | 7/2007 | Okada et al. |
| 2007/0286743 | A1 | 12/2007 | Ochab et al. |
| 2012/0152686 | A1 | 6/2012 | Brewer et al. |
| 2013/0112520 | A1 | 5/2013 | Heath et al. |
| 2013/0134006 | A1 | 5/2013 | Heath et al. |
| 2013/0199886 | A1 | 8/2013 | Heath et al. |
| 2014/0038763 | A1 | 2/2014 | Knickerbocker et al. |
| 2014/0274530 | A1 | 9/2014 | Knickerbocker et al. |
| 2015/0159743 | A1 | 6/2015 | Palmer et al. |
| 2017/0108059 | A1 | 4/2017 | Tsukamoto et al. |
| 2017/0210226 | A1 | 7/2017 | Thornton et al. |
| 2017/0268584 | A1 | 9/2017 | Heath et al. |
| 2018/0283472 | A1 | 10/2018 | Fukuda |

FOREIGN PATENT DOCUMENTS

| | | |
|---|---|---|
| EP | 1707837 A1 | 10/2006 |
| EP | 2971830 B1 | 7/2018 |
| JP | S5986748 A | 5/1984 |
| WO | 2002040891 A2 | 5/2002 |
| WO | 2014143090 A1 | 9/2014 |

OTHER PUBLICATIONS

Hilliard, "ATV/UTV", Hilliard Motion Control Division, at least as early as Jan. 2, 2020, pp. 1-7, Hilliard Corporation.

Hilliard, "Gen III Front Drive System Differential Gearcase P/N 6203-01-256 Parts and Service Manual", Rev. 0, Nov. 12, 2007, pp. 1-6, Hilliard.

International Searching Authority, "International Search Report and Written Opinion from PCT Application No. PCT/US2020/018659", from Foreign Counterpart to U.S. Appl. No. 16/793,849, dated Jun. 5, 2020, pp. 1 through 18, Published: WO.

* cited by examiner

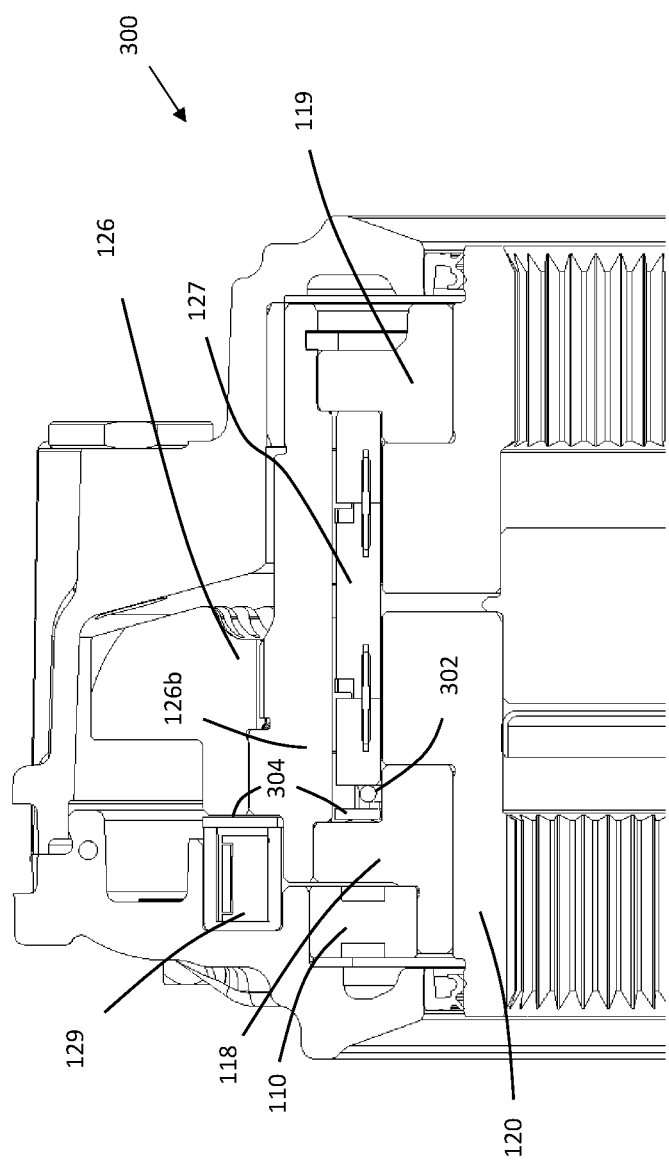

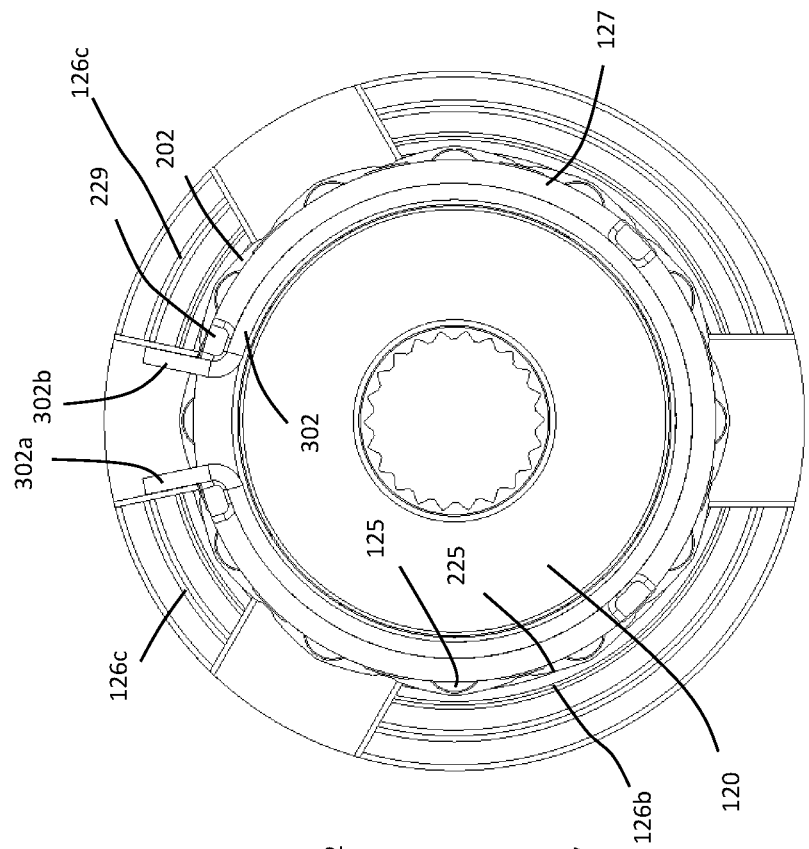
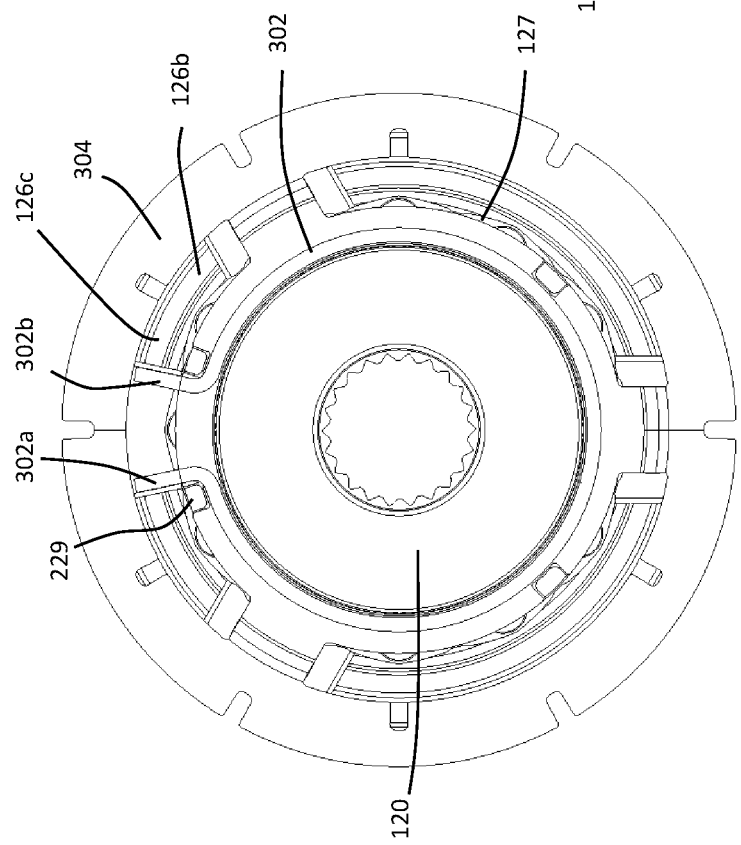
FIG. 10B
FIG. 10A

DIFFERENTIAL WITH BI-DIRECTIONAL OVERRUNNING CLUTCH

CROSS-REFERENCE TO RELATED APPLICATIONS

This application claims priority to U.S. Provisional Application Ser. No. 62/808,270, same title herewith, filed on Feb. 20, 2019 and U.S. Provisional Application Ser. No. 62/927,349, same title herewith, filed on Oct. 29, 2019 which are both incorporated in its entirety herein by reference.

BACKGROUND

Vehicle differentials transfer torque between a driveshaft and driven shafts (or half shafts). A differential allows the half shafts to rotate at different rotational speeds with relation to each other when a vehicle turns to prevent tire scrubbing, reduce transmission loads and reduce understeering during cornering (the tendency of the vehicle to go straight in a corner). In four-wheel drive applications, bi-directional overrunning clutches have been employed in differentials to transmit torque to the wheel via the halve shafts when needed. For example, in a front differential example, the front differential is designed to transfer torque when the rear wheels are rotating faster than the front wheels.

SUMMARY

The following summary is made by way of example and not by way of limitation. It is merely provided to aid the reader in understanding some of the aspects of the subject matter described. Embodiments provide an effective and efficient differential with a bi-directional overrunning clutch that may include a back-drive mode control feature.

In one example, a differential that includes a housing, a first side hub, a second side hub, a ring gear, a pinion gear, a roller cage assembly, a clutch cam housing, a centering biasing member, a first plain bearing end cap, a second plain bearing end cap and an overrunning clutch. The first and second side hubs are received within the housing is provided. The ring gear is received within the housing. The pinion gear is in operational engagement with the ring gear. The pinion gear is configured to couple torque between the ring gear and a transmission. The roller cage assembly includes rollers that engage an outer surface of the first side hub and an outer surface of the second side hub. The clutch cam housing is received around the roller cage. The clutch cam housing is operationally coupled to the ring gear. The clutch cam housing further has an internal surface with cam features. The rollers of the roller cage assembly are positioned to engage the cam features in the interior surface of the clutch cam housing to selectively couple torque between the ring gear and the first and second side hubs. The centering biasing member is positioned to provide a centering force between the roller cage assembly and the clutch cam housing to center the rollers of the roller cage assembly in associated cam features in the interior surface of the clutch cam housing. The first plain bearing end cap has an interior surface that forms a plain bearing interface with an outer surface of the first side hub. The first plain bearing end cap further has a first outer surface portion that engages a first end portion of the roller cage assembly. The second plain bearing end cap has an interior surface that forms a plain bearing interface with an outer surface of the second side hub. The second plain bearing end cap further has a first outer surface portion that engages a second end portion of the roller cage assembly. The first and second plain bearing end caps support a positional location of the roller cage assembly. The overrunning clutch (ORC) assembly is configured to selectively engage the roller cage assembly during an ORC condition to provide a torsion force to overcome the centering force provided by the centering biasing member therein allowing the rollers of the roller cage assembly to move in the respective cam features in the interior surface of the clutch cam housing to selectively couple torque between the ring gear and the first and second side hubs.

In another example, a differential including a housing, a first side hub, a second side hub, a ring gear, a pinion gear, a roller cage, a clutch cam housing, a centering spring, a first plain bearing end cap, a second plain bearing end cap, an overrunning clutch (ORC) assembly and a back-drive mode control assembly is provided. The first and second side hubs are received within the housing. The ring gear is received within the housing. The pinion gear is in operational engagement with the ring gear. The pinion gear is configured to couple torque between the ring gear and a transmission. The roller cage assembly includes rollers that engage an outer surface of the first side hub and an outer surface of the second side hub. The clutch cam housing is received around the roller cage. The clutch cam housing is operationally coupled to the ring gear. The clutch cam housing further has an internal surface with cam features. The rollers of the roller cage assembly are positioned to engage the cam features in the interior surface of the clutch cam housing to selectively couple torque between the ring gear and the first and second side hubs. The centering spring is positioned to provide a centering force between the roller cage assembly and the clutch cam housing to center the rollers of the roller cage assembly in associated cam features in the interior surface of the clutch cam housing. The first plain bearing end cap has an interior surface that forms a plain bearing interface with an outer surface of the first side hub. The first plain bearing end cap further has a first outer surface portion that engages a first end portion of the roller cage assembly. The second plain bearing end cap has an interior surface forming a plain bearing interface with an outer surface of the second side hub. The second plain bearing end cap further has a first outer surface portion that engages a second end portion of the roller cage assembly. The first and second plain bearing end caps support a positional location of the roller cage assembly. The ORC assembly is configured to selectively engage the roller cage assembly during an ORC condition to provide a torsion force to overcome the centering force of the centering spring allowing the rollers of the roller cage assembly to move in the respective cam features in the interior surface of the clutch cam housing to selectively couple torque between the ring gear and the first and second side hubs. The back-drive mode control assembly is configured to selectively engage the roller cage assembly during a back-drive mode condition.

In yet another example, a vehicle including motor, a transmission, a rear differential, a front differential and at least one controller is provided. The motor provides engine torque. The transmission is in torsional communication with the motor. The rear differential is configured to selectively couple torque between the transmission and a pair of rear wheels. The front differential is configured to selectively couple torque between the transmission and a pair of front wheels. At least one of rear differential and the front differential includes a first side hub, a second side hub, a ring gear, a pinion gear, a roller cage, a clutch cam housing, a centering biasing member, a first bearing end cap, a second bearing end cap and an overrunning clutch (ORC) assembly. The first and second side hubs are received within the housing. The ring gear is received within the housing. The pinion gear is in operational engagement with the ring gear. The pinion gear is configured to couple torque between the ring gear and a transmission. The roller cage assembly includes rollers that engage an outer surface of the first side hub and an outer surface of the second side hub. The clutch cam housing is received around the roller cage. The clutch cam housing is operationally coupled to the ring gear. The clutch cam housing further has an internal surface with cam features. The rollers of the roller cage assembly are positioned to engage the cam features in the interior surface of the clutch cam housing to selectively couple torque between the ring gear and the first and second side hubs. The centering biasing member is positioned to provide a centering force between the roller cage assembly and the clutch cam housing to center the rollers of the roller cage assembly in associated cam features in the interior surface of the clutch cam housing. The first plain bearing end cap has an interior surface that forms a plain bearing interface with an outer surface of the first side hub. The first plain bearing end cap further has a first outer surface portion that engages a first end portion of the roller cage assembly. The second plain bearing end cap has an interior surface that forms a plain bearing interface with an outer surface of the second side hub. The second plain bearing end cap further has a first outer surface portion that engages a second end portion of the roller cage assembly. The first and second plain bearing end caps support a positional location of the roller cage assembly. The ORC assembly is configured to selectively engage the roller cage assembly during an ORC condition to provide a torsion force to overcome the centering force provided by the centering biasing member therein allowing the rollers of the roller cage assembly to move in the respective cam features in the interior surface of the clutch cam housing to selectively couple torque between the ring gear and the first and second side hubs. The at least one controller is configured to activate the ORC assembly during an ORC condition.

BRIEF DESCRIPTION OF THE DRAWINGS

Embodiments can be more easily understood and further advantages and uses thereof will be more readily apparent, when considered in view of the detailed description and the following figures in which:

FIG. 9 is a close-up partial cross-sectional view of the differential of FIG. 7;

FIG. 10A is an end view of a portion of the differential of FIG. 7 including an armature plate/clutch cam housing configuration;

FIG. 10B is an end view of a portion of the differential of FIG. 7 including the clutch housing configuration;

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
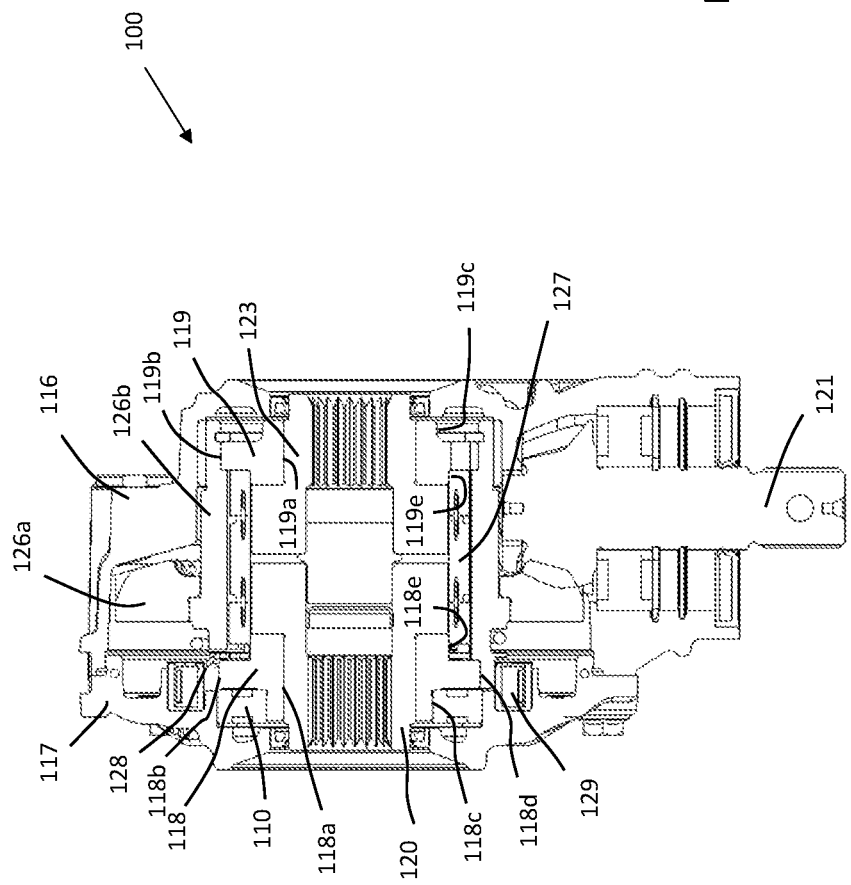
FIG. 1 is a cross-sectional side view of a differential including an over-running clutch according to one exemplary embodiment.
Figure 2:
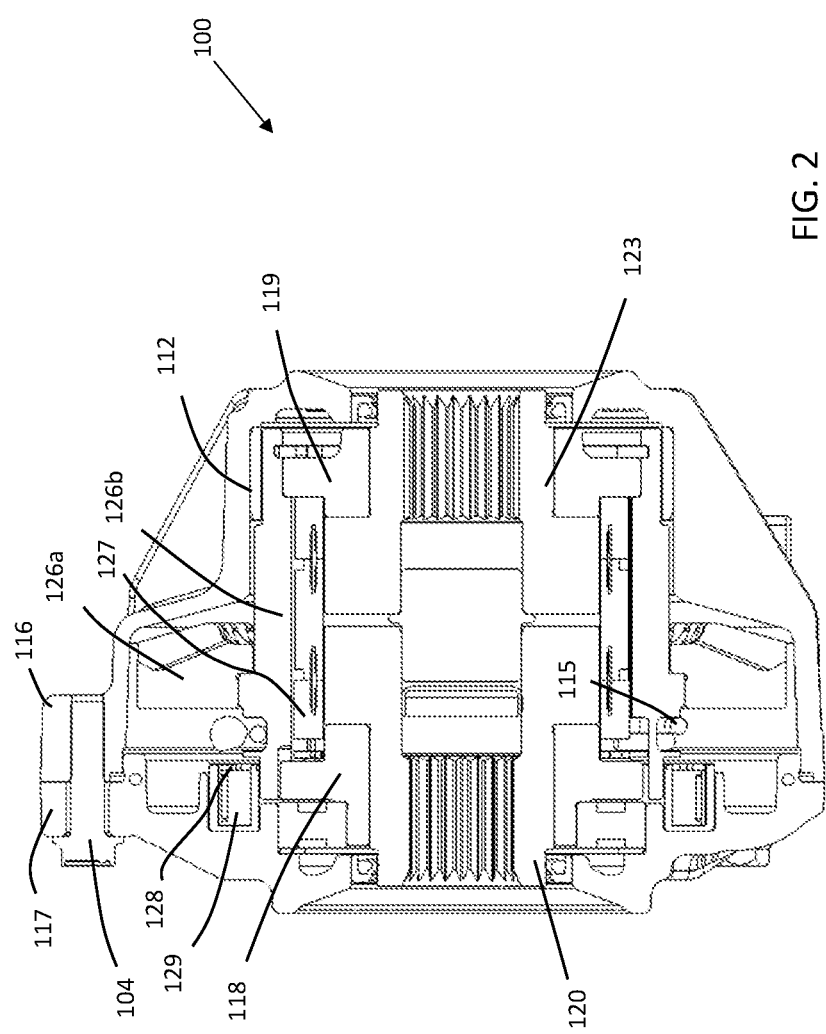
FIG. 2 is a different cross-sectional side view of the differential of FIG. 1.
Figure 3:
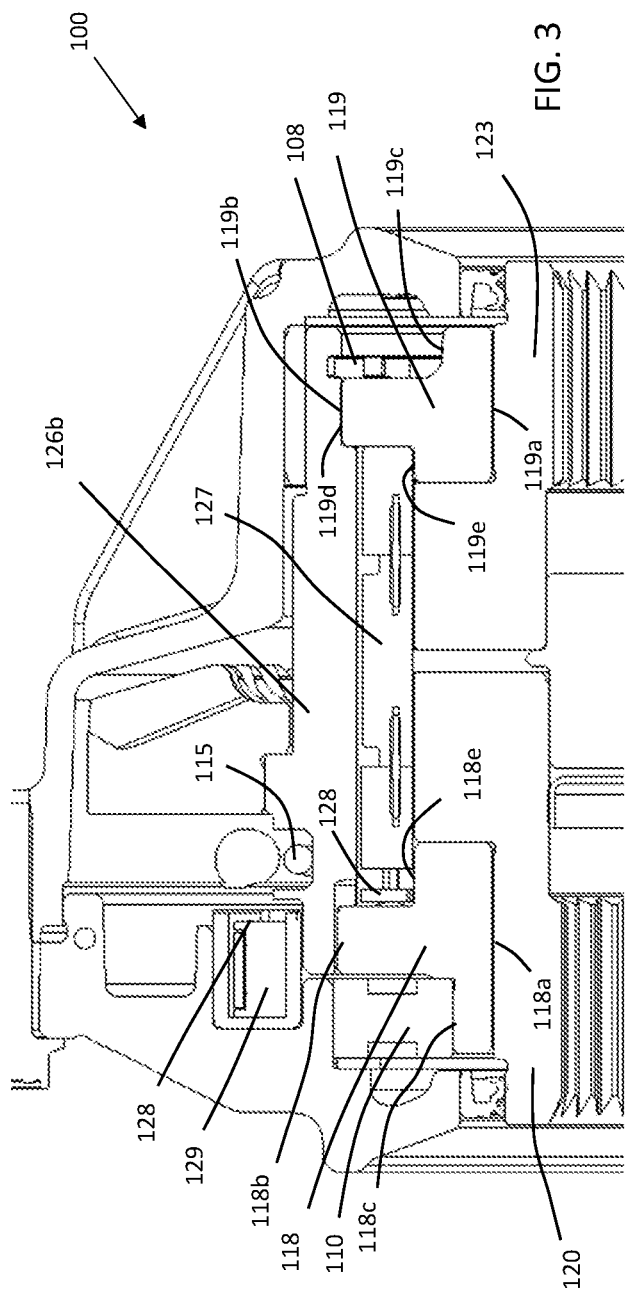
FIG. 3 is a close up partial cross-sectional view of the differential of FIG. 1.
Figure 4:
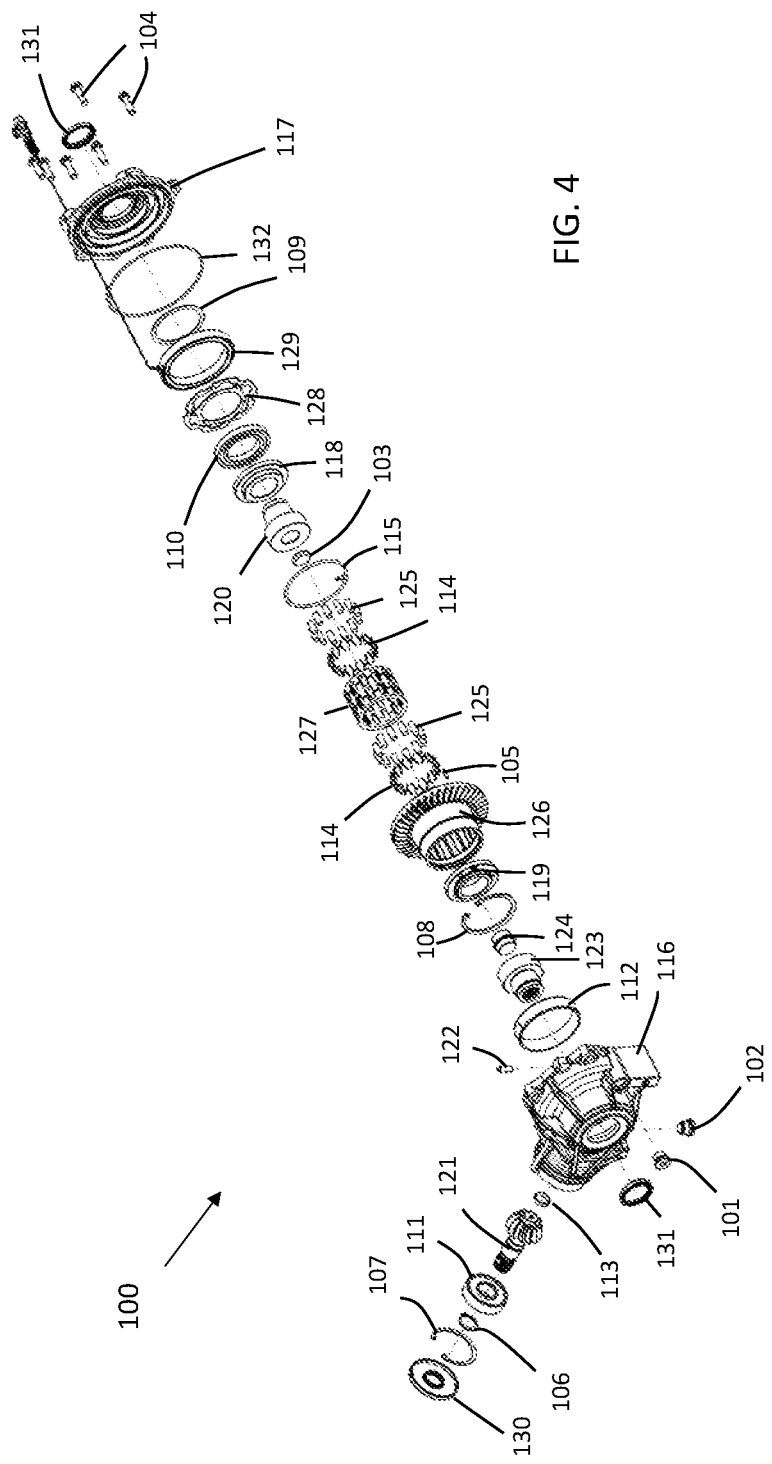
FIG. 4 is an exploded side perspective view of the differential of FIG. 1.

Embodiments provide a differential 100 that utilize a pair of spaced plain bearings with a bi-directional overrunning clutch (ORC). Further in some embodiments a differential with a back-drive mode control assembly is provided. One example embodiment of a differential is illustrated in FIGS. 1-4. In particular, FIGS. 1-3 illustrate different cross-sectional side views of the example differential 100 and FIG. 4 illustrates an exploded view of differential 100.

Differential 100 includes a housing having a case 116 with a cover 117. Within the housing is located a roller cage assembly 127, first and second side hubs 120 and 123 and a ring gear/clutch cam housing 126. The ring gear/clutch cam housing 126 includes a ring gear 126a and a clutch cam housing 126b in an embodiment. Within the housing further includes plain bearing 112, centering hub 124, retaining ring 108 and a first plain bearing end cap 118. Further included in the housing, related to the roller cage assembly 127, is a slotted spring pin 105, roller springs 114 and rollers 125. Further still within the housing is round spring 115 (torsion or centering spring), expansion plug 103, second plain bearing end cap 119, ball bearing 110, armature plate 128, shim 109 and O-ring seal 132. The cover 117 of the housing is coupled to the case 116 via fasteners 104. Dual lip seals 131 are positioned within openings to the housing where respective half shafts would extend through to engage respective sides hubs 120 and 123. A vent tube 122 is received in a passage of the case 116. Further, plugs 101 and 102 are threadably engaged in respective threaded passages in the case 116. Plug 102 may be magnetic.

Torque from a prop shaft is provided to the ring gear/clutch cam housing 126 via pinion 121 that passes through another passage in the case 116. Associated with the pinion 121 is a plain bearing 113, a ball bearing 111, a retaining ring 106, beveled retaining ring 107 and triple lip seal 130 in this example embodiment.

Further illustrated in FIG. 2-4, the differential 100 includes an inner housing coil 129 (or ORC electromagnetic coil) that selectively manipulates a cage connector 128 (ORC armature plate 128) to position the roller cage assembly 127 into an engagement ready orientation. A closeup view illustrating this is illustrated in FIGS. 2 and 3.

Figure 30:
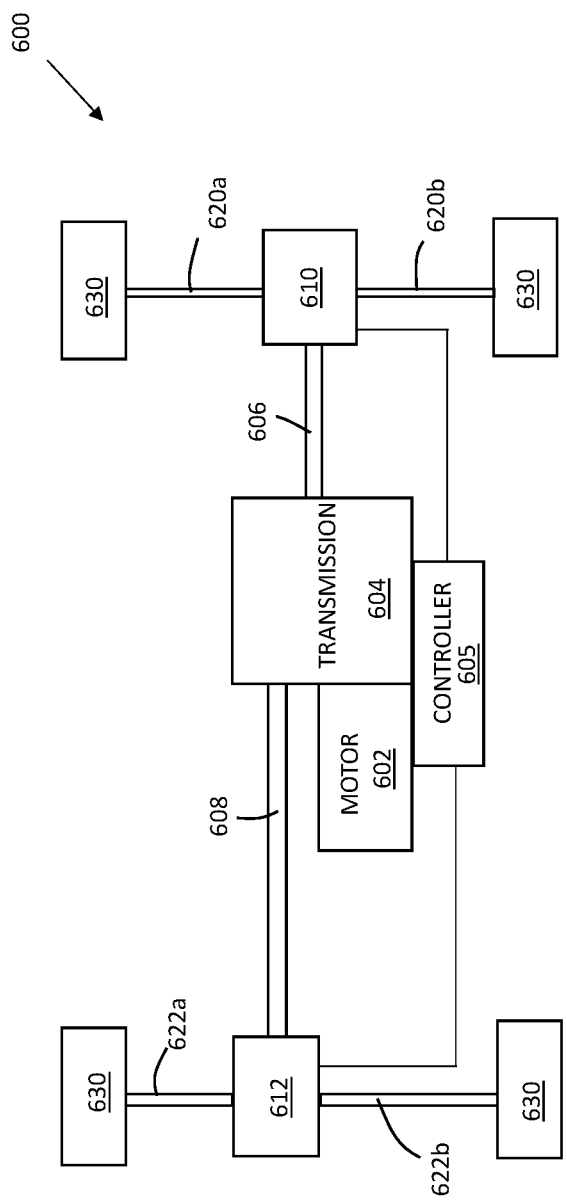
FIG. 30 is a block diagram of a vehicle according to one exemplary embodiment.
Figure 31:
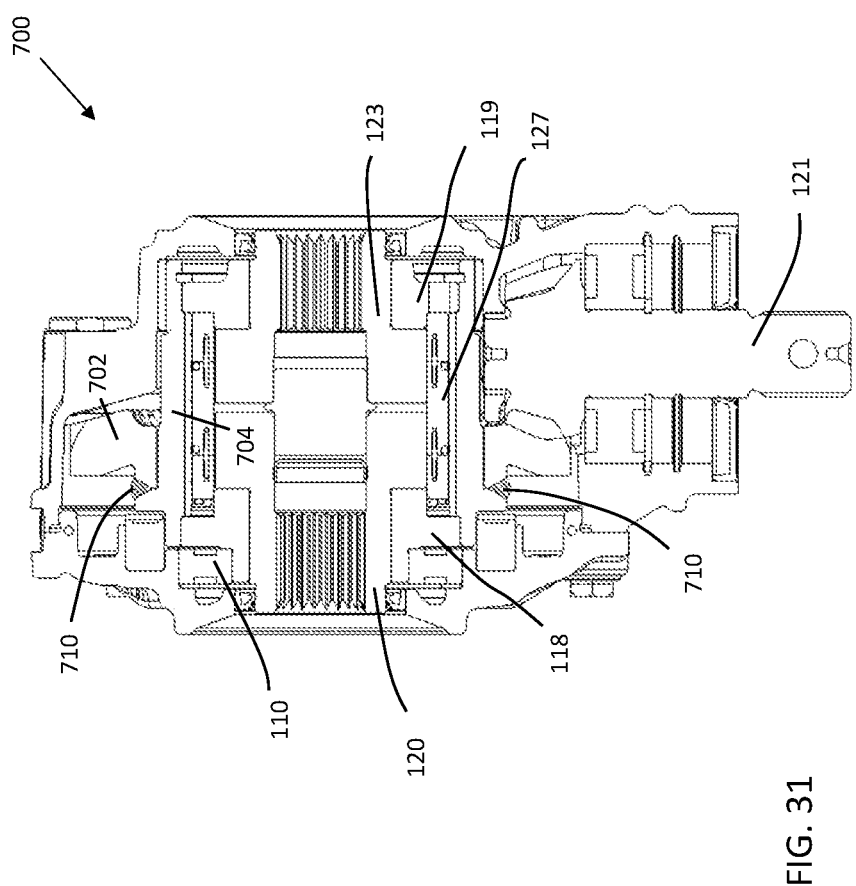
FIG. 31 is a cross-sectional side view of a differential according to one exemplary embodiment.

Referring to FIG. 1, the pinion 121, in this example, couples torque between a motor/transmission arrangement (such as the motor/transmission 602 and 604 illustrated in FIG. 30) and the differential 100 via prop shaft (such as prop shafts 606 and 608 of FIG. 30). The pinion 121 is operationally coupled to the ring gear/clutch cam housing 126 which is in turn in operational communication with the rollers 125 in part located by the roller cage assembly 127. The ring gear hub 126 (ring gear 126a and clutch cam housing 126b) may be a one-piece part or a two-piece part. In the example of FIG. 1, the ring gear hub 126 is a two-piece part that includes a gear portion (ring gear 126a) and the hub portion (the clutch cam housing 126b). FIG. 31 illustrates another example of a differential 700 where the ring gear hub 702 is coupled to the clutch cam housing 704 via weld 710.

The rollers 125 in part, located by the roller cage assembly 127, are operationally engaged with outer surfaces of the side hubs 120 and 123. In the embodiment of FIG. 1, the roller cage 202 of the roller cage assembly 127 never directly touches the ring gear/clutch cam housing 126 but is located in all degrees of freedom except rotation by the end caps 118 and 119 that are located by the clutch cam housing 126. When the system is engaged in ORC or back-drive mode (described below), the rollers 125 are in direct contact with the clutch cam surfaces of 126b of the clutch cam housing 126 and the side hubs 120 and 123.

As best illustrated in FIG. 3, the first end cap 118 includes an inner surface 118a that provides a plain bearing interface with an outer surface of the first side hub 120. That is, in this example, the first plain bearing end cap 118 acts as a plain bearing. The first plain bearing end cap 118 has a stepped outer surface 118b that forms a first outer interface portion 118c, a second outer interface portion 118d and a third outer interface portion 118e. In this example, each of the outer interface portions 118c, 118d and 118e are a positioned at different diameters in relation with each other due to different radial diameter depths along a width of the first plain bearing end cap 118. Further in this example, the middle outer interface portion 118d has the largest diameter while outer interface portion 118c has the smallest diameter. In this example, an inner surface of bearing 110 engages the interface portion 118c of the first end cap 118. The interface portion 118e partially engages an inner end portion of the roller cage assembly 127 and the cage connector 128. The engagement between the interface portion 118e and the inner end portion of the roller cage assembly is a rotational engagement.

The second plain bearing end cap 119 includes an inner surface 119a that provides a plain bearing interface with an outer surface of the second side hub 123. That is, in this example, the second plain bearing end cap 119 acts as a plain bearing. The second plain bearing end cap 119 has a stepped outer surface 119b that forms a first outer interface portion 119c, a second outer interface portion 119d and a third outer interface portion 119e. In this example, each of the outer interface portions 119c, 119d and 119e are a positioned at different diameters in relation with each other due to different diameter depths along a width of the second end cap 119. Further in this example, the middle outer interface portion 119d has the largest diameter while outer interface portion 119c has the smallest diameter. In this example, interface portion 119e rotationally engages the other inner end portion of the roller cage assembly 127 and interface portion 119d of the second plain bearing end cap 119 engages another end portion of the clutch cam housing 126b.

In this embodiment, the roller cage assembly 127 is supported by the first and second plain bearing end caps 118 and 119. In particular, engagement of the outer interface portion 118e of the first plain bearing end cap 118 rotationally engaging a first inner end portion of roller cage and the outer interface outer interface portion 119e of the second plain bearing end cap 118 rotationally engaging a second inner end portion of roller cage provides support of the roller cage assembly. This arrangement prevents the centering spring 115 from forcing the roller cage assembly 127 off center. Further as illustrated, the hub portion 126b (or clutch cam housing 126b) includes inner step portions to receive the outer portions 118b and 119b of the respective first and second plain bearing end caps 118 and 119. Moreover, the first and second side hubs 120 and 123 include an outer recess step portions to receive the inner portions 118a and 119a of the respective first and second plain bearing end caps 118 and 119.

Figure 6:
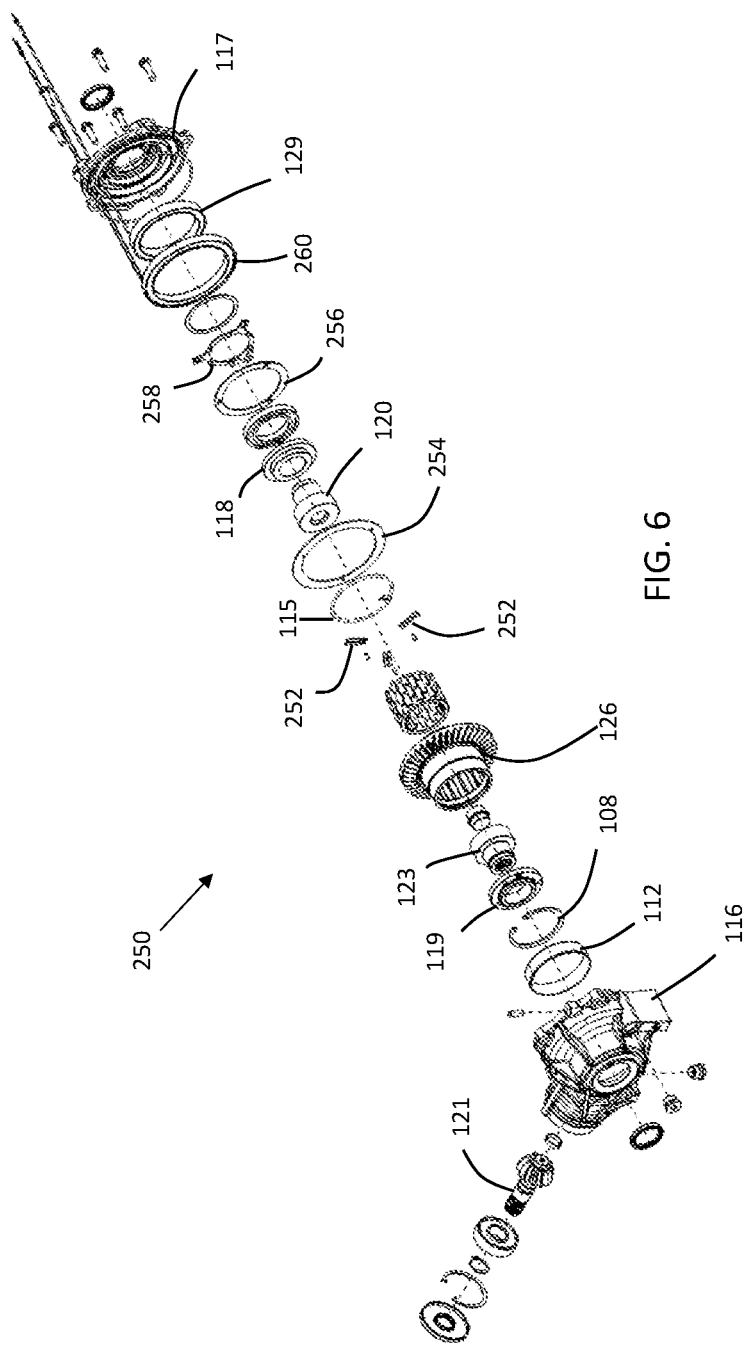
FIG. 6 is an exploded side perspective view a differential with over-running clutch assembly and back drive mode control assembly according to one exemplary embodiment.

FIG. 6 illustrates an exploded view of another ORC differential 250 that includes an back drive mode control (BDMC). Beside the components described in the above embodiment, this embodiment also includes an BDMC pivot arms 252 that pivot about dowel pins that are located on the clutch cam housing 126b. Further, this embodiment includes an back-drive mode armature plate 254 and an ORC armature plate 256. Also, a connector plate 258 is used to connect the roller cage assembly 127 to the ORC armature plate 256. Also illustrated is an ORC electromagnetic coil 129 that is configured to selectively manipulate the ORC armature plate 256 to engage the roller cage assembly 127 during an ORC situation and an BDMC electromagnetic coil 260 configured to selectively manipulate the back-drive mode armature plate 254 to engage the roller cage assembly 127 during a back-drive mode condition.

As previously described, the ORC mode allows the front axle to freely over-run the ring gear and clutch cam hub assembly 126. As a result, in off-throttle downhill conditions, this operating mode doesn't provide engine braking through the front tires. However, in certain driving conditions, such as steep descents in hilly terrain, the BDMC mode changes the clutch operation to the opposite mode ORC where the front wheels cannot overrun the ring gear and clutch cam hub assembly 126, and thus the front wheels are able to provide engine braking in the BDMC mode.

Figure 7:
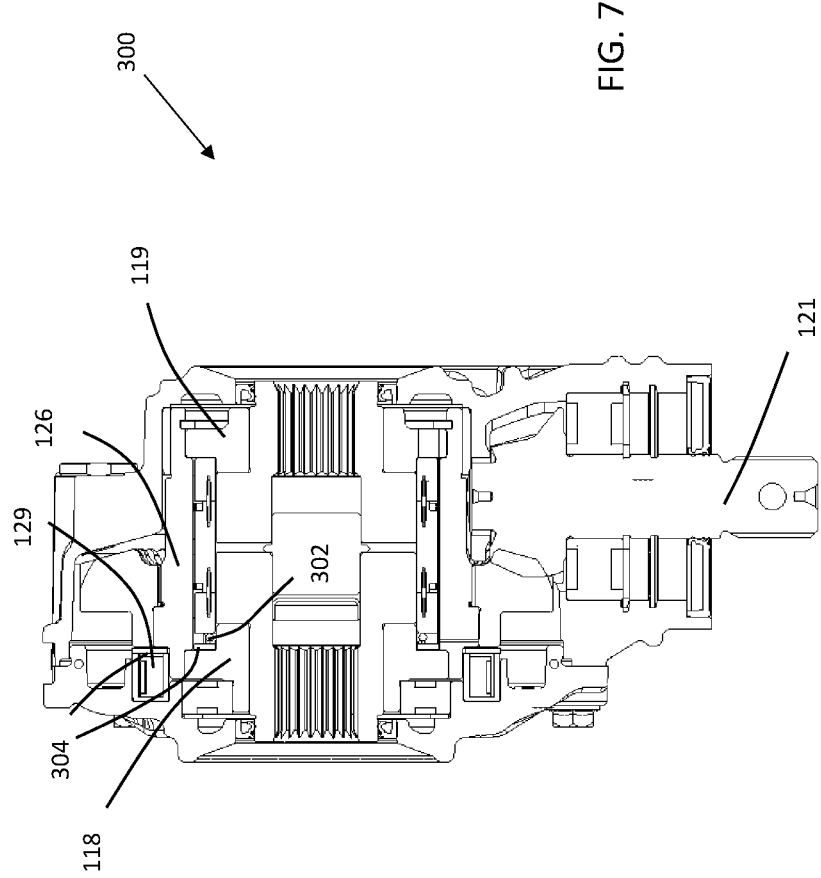
FIG. 7 is a cross-sectional side view of another differential with an over-running clutch assembly according to one exemplary embodiment.
Figure 8:
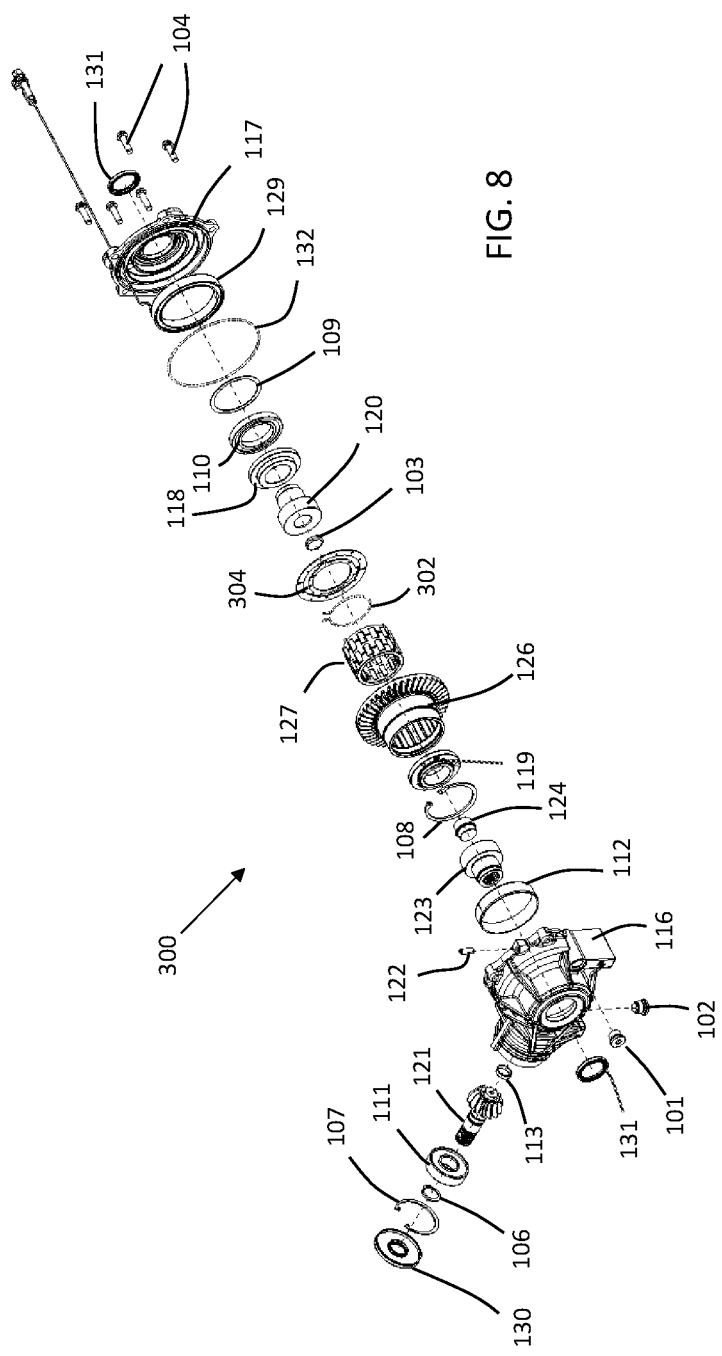
FIG. 8 is an exploded side perspective view of the differential of FIG. 7.

FIGS. 7-9 illustrate yet another embodiment of a differential 300 with an ORC. FIG. 7 illustrates an assembled cross-sectional side view of the differential. Many of the components are the same as the embodiments discussed above as illustrated in the exploded view of FIG. 8. This embodiment further includes an omega shaped torsion spring 302 (centering spring 302) and an armature plate 304. The ORC electromagnetic coil 129 is configured to attract and provide frictional drag torque to the armature plate 304 to engage the roller cage assembly 127 during ORC operation. A close-up of the centering spring 302 and the armature plate 304 in the assembled differential is best illustrated in the partial cross-sectional side view of the differential 300 illustrated in FIG. 9.

Figure 14:
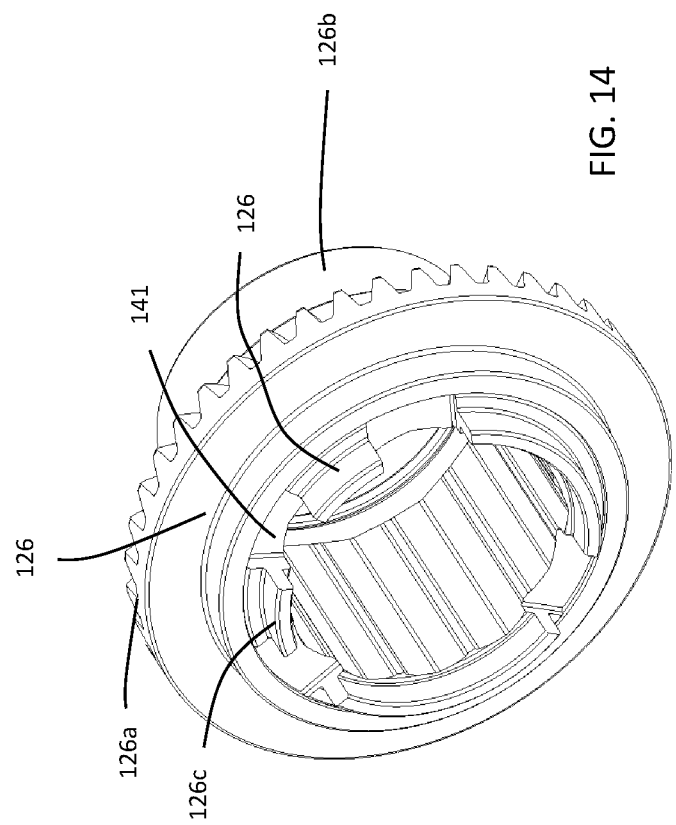
FIG. 14 is an end perspective view of a ring gear/clutch cam housing according to one exemplary embodiment.

Referring to the end views of the ring gear clutch cam housing 126 in FIGS. 10A and 10B an illustration of ends 302a and 302b of the centering spring 302 axially extending engaging members 126c of the ring gear clutch cam housing 126b and engagement tabs 229 of the roller cage assembly 127 is provide in this example embodiment. The axially extending engaging members 126c are best illustrated in FIG. 14. The axially extending members 126c are spaced from each other to form access slots 141 therebetween. The ends 302a and 302b are positioned within an access slot 141 to engage adjacent axially extending engaging members 126c. Although springs are shown in embodiments as providing the centering function, other types of centering biasing members may be used.

Figure 5:
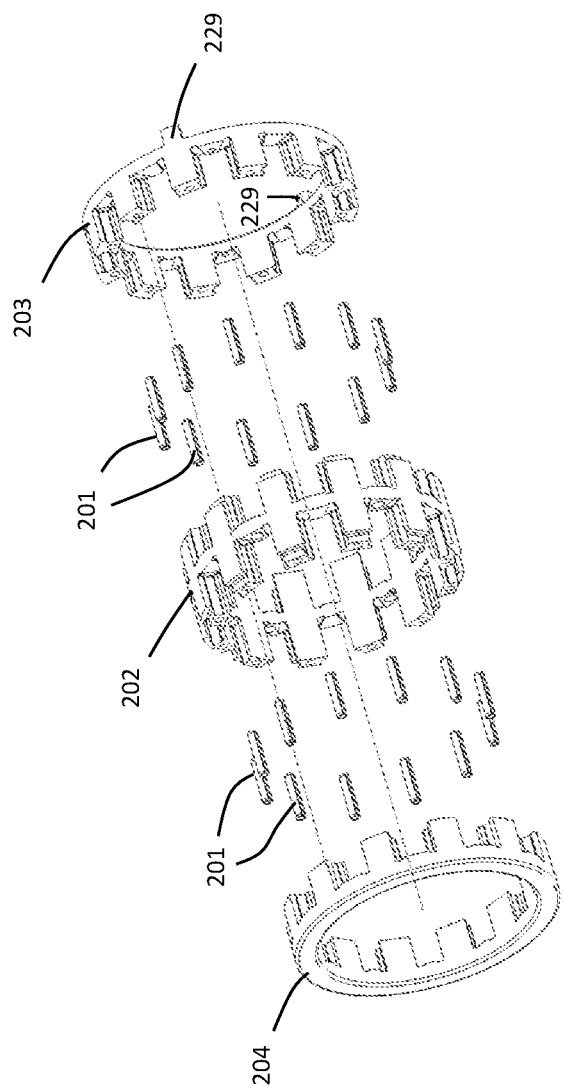
FIG. 5 illustrates an exploded view of the roller cage assembly used in the differential of FIG. 1.

The roller cage assembly 127 in one embodiment is made from a three-piece assembly (the mid-section 202, the first end cap 203 and the second end cap 204) as illustrated in FIG. 5. Spring pins 201 are used to hold the pieces together. In another embodiment, the roller cage assembly 127 is formed as a single piece. The first end cap 203, in this example, include spaced axially extending engagement tabs 229. The ends 302a and 302b of the centering spring 302 are also positioned to engage the axially extending engagement tabs 229 of the first end cap 203 of the roller cage assembly 127 with axially extending members 126c (shoulder features) of the clutch cam housing 126b as best illustrated in FIGS. 10A and 10B. This arrangement provides a counter force to movement between the roller cage assembly 127 and the clutch cam housing 126b. FIG. 10B further illustrates the cam features 225 in the inner surface of the clutch cam housing 126b in which the rollers 125 of the roller cage assembly 127 engage. The centering spring 302 centers the rollers 125 in centers of cam features 225 so that torque is not transferred between the ring gear 126a and first and second side hubs 120 and 123 when a countering force is not present. Countering forces may include dynamic inertial forces from changes in rotational velocity, viscous lubrication drag, engaged contact forces, or the frictional drag of the operatively connected armature plate 304 relative to the electromagnetic coil 129. Further, countering forces may also include the frictional drag of the operatively connected ring gear (126a)/roller cage assembly (127) by the ORC assembly.

Figure 11B:
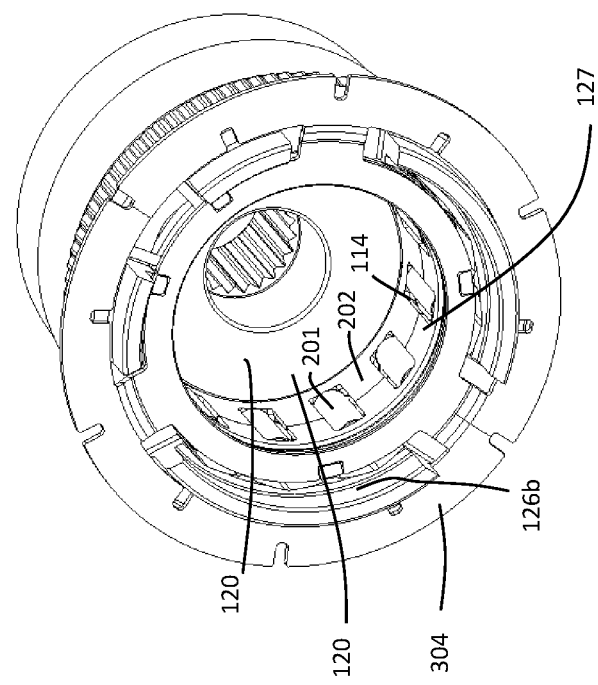
FIG. 11B is an end view of a portion of the armature plate/clutch housing configuration of the differential of FIG. 7.
Figure 11A:
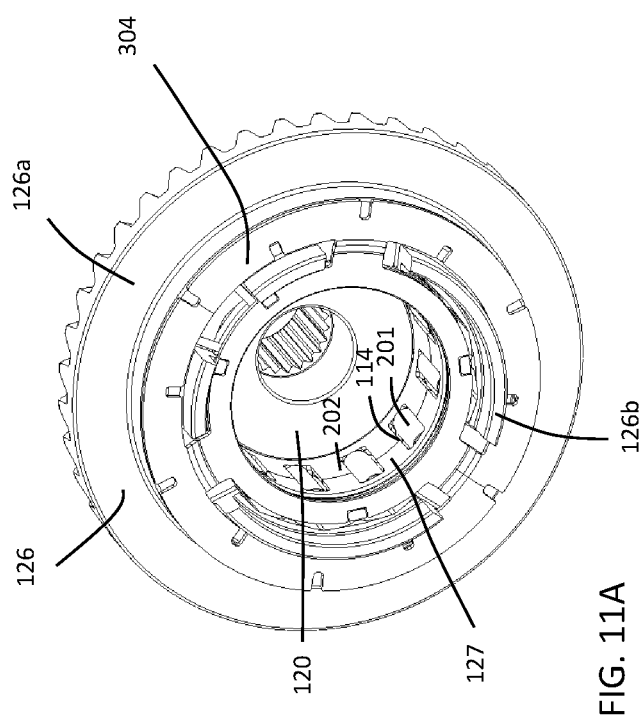
FIG. 11A is an end perspective view of a portion of the differential of FIG. 7 including the armature plate/ring gear configuration.
Figure 12:
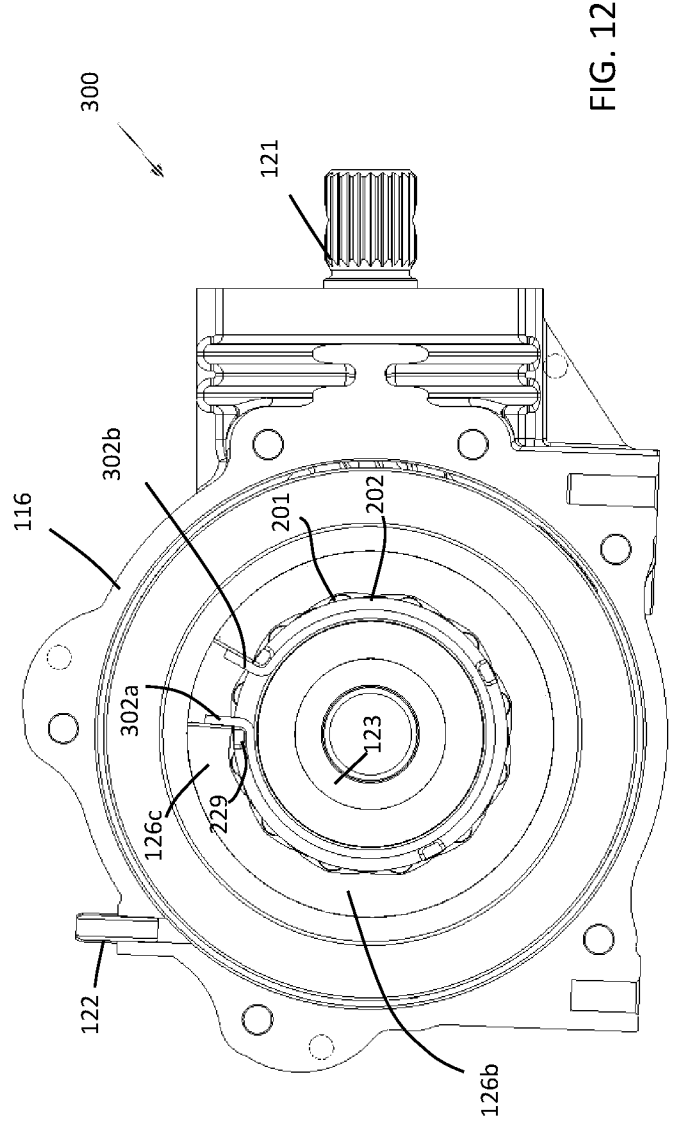
FIG. 12 is an end cross-sectional view of the differential of FIG. 7.

FIGS. 11A and 11B illustrate side perspective views of a ring gear/clutch cam housing 126 in an example embodiment shown without the centering spring. In the example of FIG. 11A, the armature plate 304 received around the clutch cam housing 126b is illustrated. Also illustrated is the roller cage assembly 127, rollers 125, roller springs 114 and output hub 120 in this ORC only embodiment. In FIG. 11B, a clutch cam housing 126b of an example is illustrated. This view also includes the armature plate 304, roller cage assembly 127, rollers 125 roller springs 114 and output hub 120. FIG. 12 further illustrates the poisoning of the centering spring 302 in the differential 300 embodiment.

Figure 13:
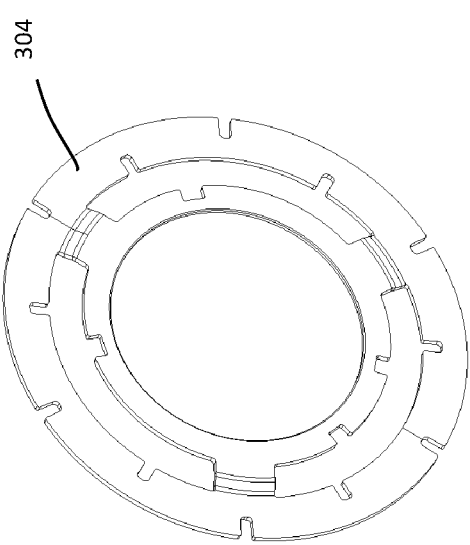
FIG. 13 is an end perspective view of an armature plate according to one exemplary embodiment.

FIG. 13 illustrates a close-up view of the armature plate 304 of the embodiment illustrated in FIGS. 7 through 11B. As discussed above, the ORC electromagnetic coil 129 is configured to attract and provide frictional drag torque to the armature plate 304 to engage the roller cage assembly 127 during ORC operation. FIG. 14 illustrates the ring gear/clutch cam housing 126 in this embodiment that includes the ring gear 126a and hub portion 126b without the armature plate 304 mounted thereon. Also illustrated in this view is engage portions 126c of the clutch cam housing 126 used to engage the ends 302a and 302b of the centering spring 302.

Figure 15:
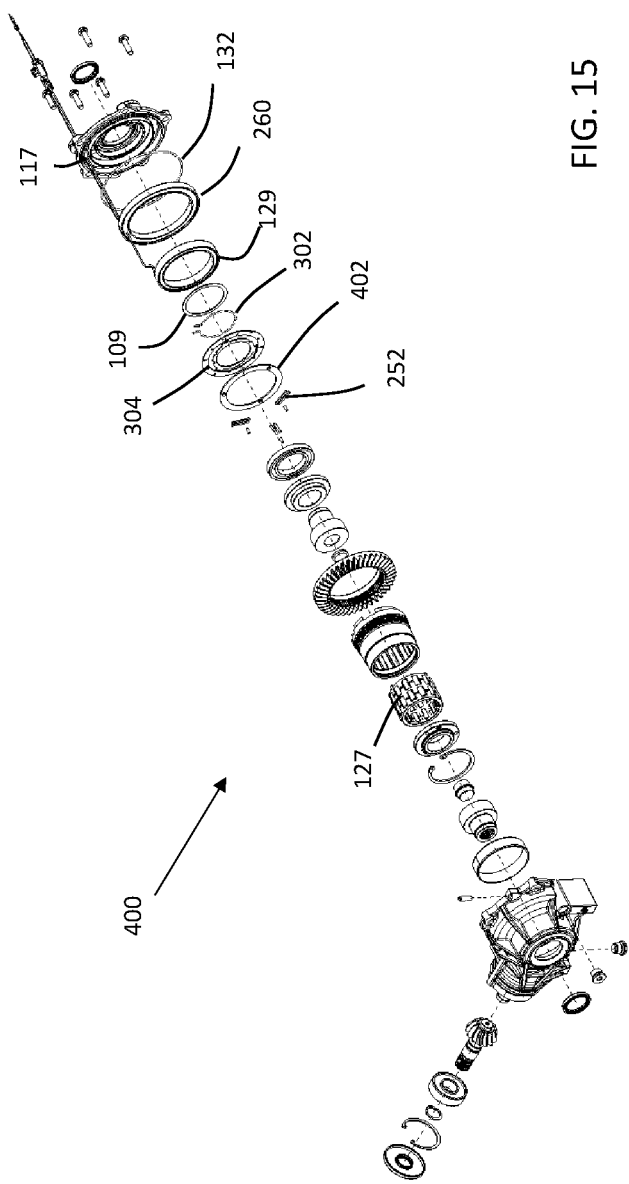
FIG. 15 is an exploded side perspective view another differential with an over-running clutch assembly and back drive mode control assembly according to one exemplary embodiment.
Figure 16:
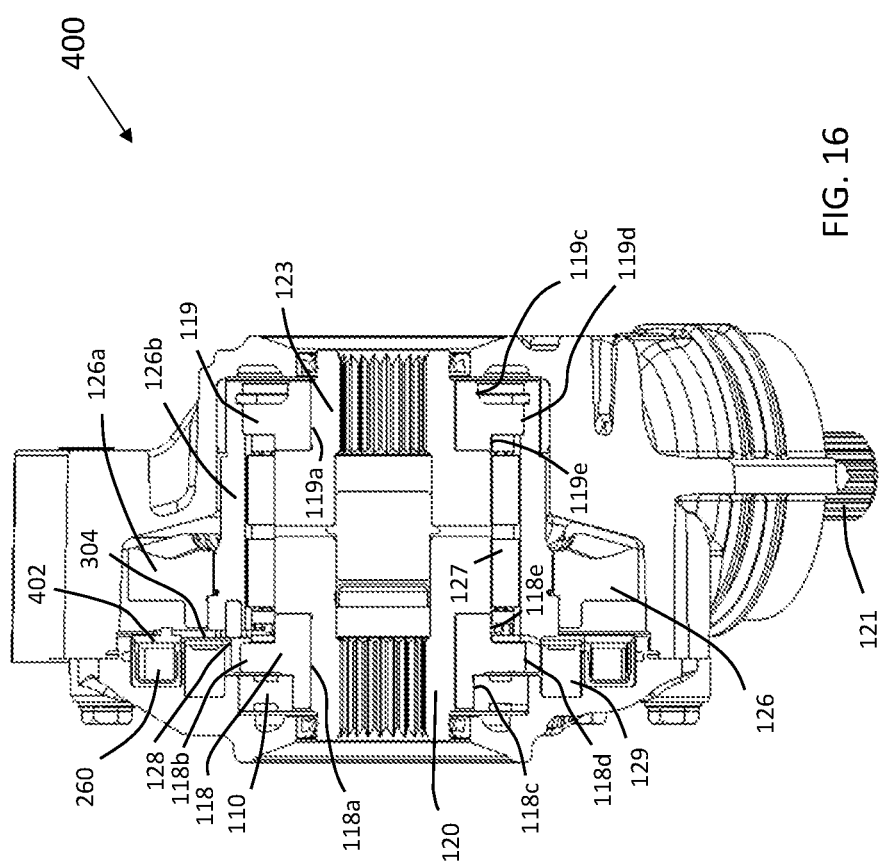
FIG. 16 is a cross-sectional view of the differential of FIG. 15.
Figure 17:
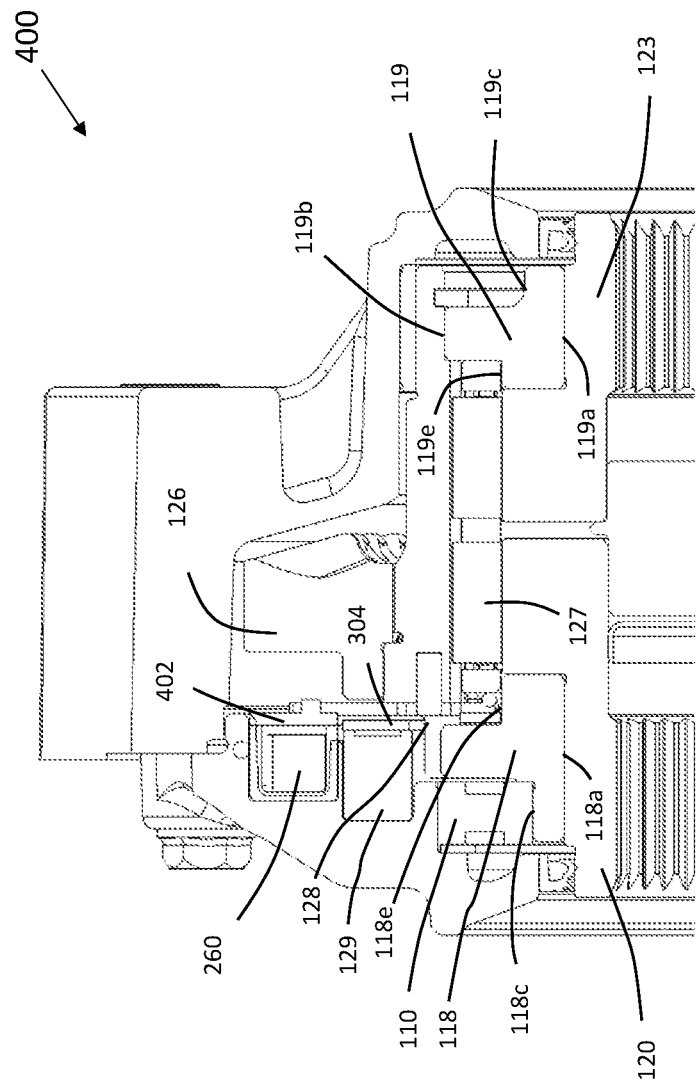
FIG. 17 is a partial cross-sectional view of the differential of FIG. 15

FIGS. 15 through 17 illustrate another embodiment of a differential 400 that includes both ORC and BDMC functions similar to the embodiment illustrated in FIG. 6. In particular, FIG. 15 illustrates a side perspective unassembled view, FIG. 16 illustrates a cross sectional side view of the differential 400 and FIG. 17 illustrates a close-up view of a portion of the differential 400. Here again, similar parts to the differentials discussed above are used. The dissimilar parts include back-drive pivot arms 252, back-drive armature plate 402 and ORC armature plate 304. The ORC electromagnetic coil 129 is configured to selectively manipulate the ORC armature plate 304 to engage the roller cage assembly 127 during an ORC situation and an back-drive electromagnetic coil 260 configured to selectively manipulate the back-drive armature plate 402 to engage the roller cage assembly 127 during a back-drive situation.

Figure 18:
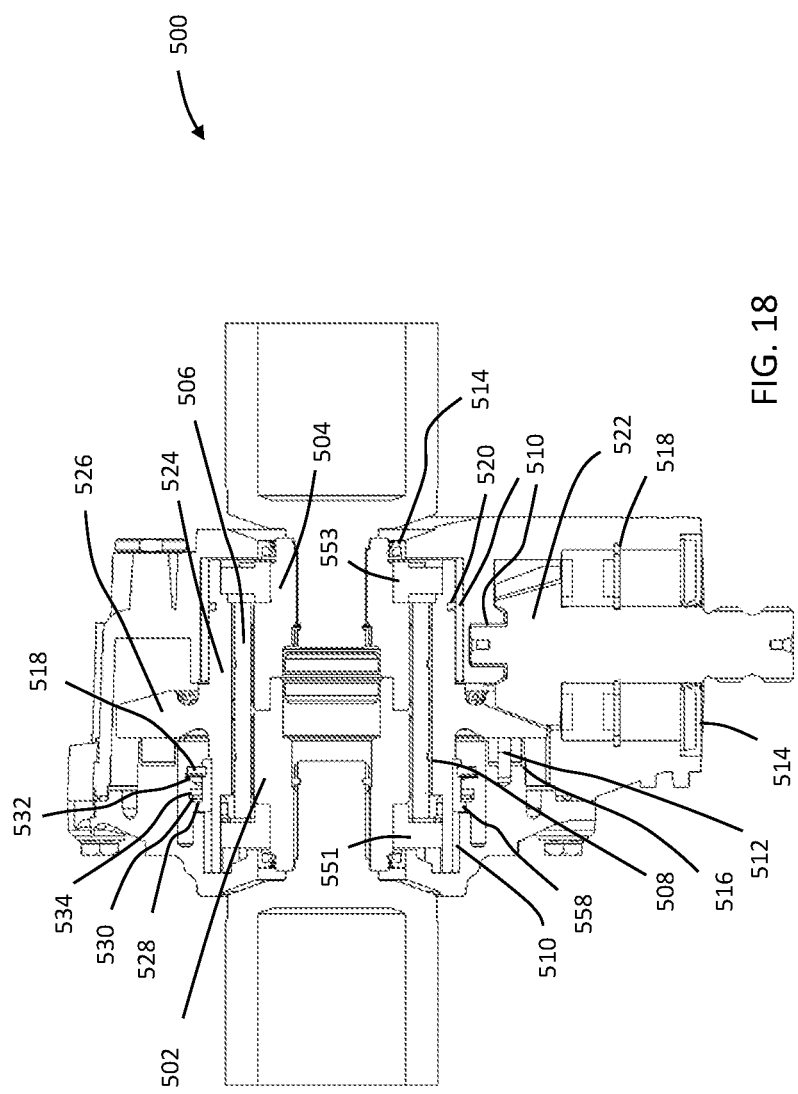
FIG. 18 is a cross-sectional side view of yet another differential according to one exemplary embodiment.

FIGS. 18 through 23 illustrated yet another embodiment of a differential 500. FIG. 18 illustrates a cross-sectional side view of this differential 500 example. As illustrated, the differential 500 includes a first side hub 502 and a second side hub 504 in which respective half shafts, such as half shafts 620a, 620b, 622a and 622b illustrated in FIG. 30, are coupled. A cage 506 that holds clutch rollers 508 are positioned around select portions of the side hubs 502 and 504. Differential 500 also includes bushings 510, thrust bushing 512, seals 514, backlash shim 516, snap rings 518 and omega spring 520. The differential 500 further includes a pinion gear 522 that is in rotational communication with a driveshaft, such as drive shaft 606 or 608 of FIG. 30. Differential 500 further includes a clutch cam housing 524, a ring gear 526, an engagement drag plate 528, a cage connector 530, a wave spring 532 and a friction plate 534.

Figure 19:
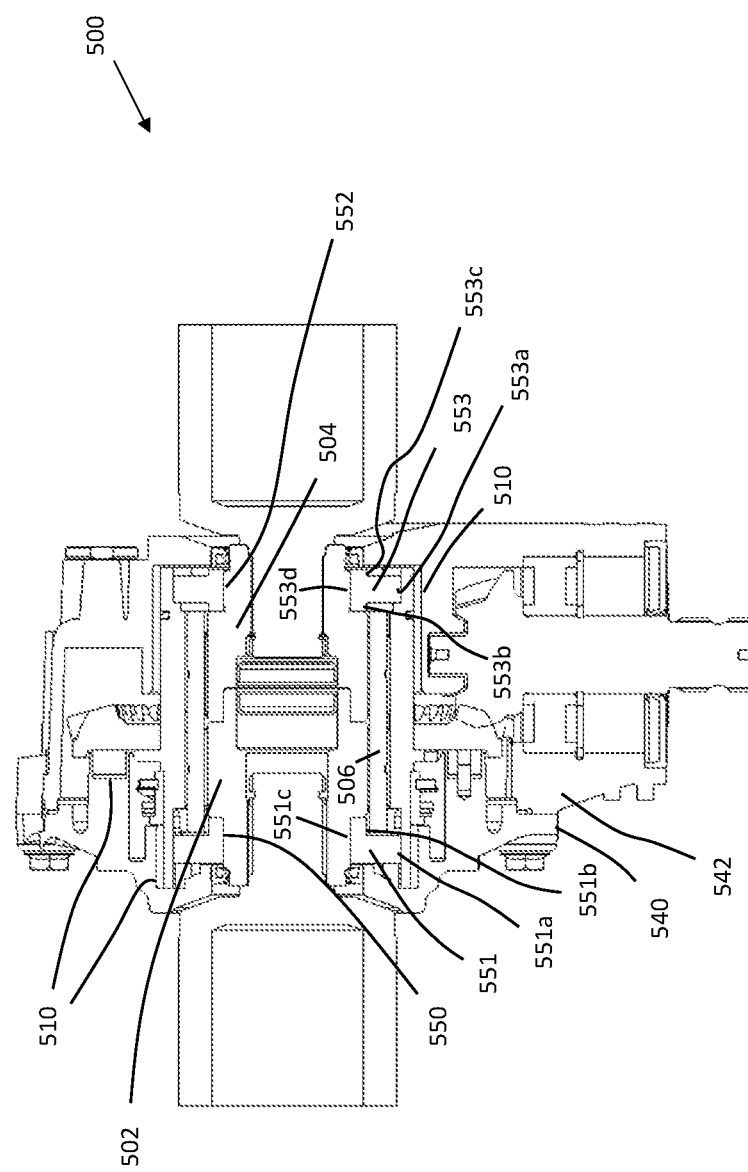
FIG. 19 is another cross-sectional side view of the differential of FIG. 18.

FIG. 19 is cross-sectional side view of the differential 500 further illustrate a housing that includes a cover 540 and case 542. FIG. 19 further illustrates a first plain bearing end cap 551 and second plain bearing end cap 553 that act as plain bearings 551 and 553. In this example, the first plain bearing end cap 551 forms a plain bearing interface between first end cap 551 and an outer surface of the first side hub 502 and second plain bearing end cap 553 forms a plain bearing interface 552 between plain bearing end cap 553 and an outer surface of the second hub 504. Further, the first plain bearing end cap 551 in this embodiment, includes an outer surface 551a and an inner surface 551c. Inner surface 551c of first plain bearing end cap 551 forms plain bearing interface 550. The outer surface of the first plain bearing end cap 551 includes a step portion 551b of reduced diameter. Step portion 551b engages a portion of the cage 506 and outer surface 551a engages a portion of the clutch cam housing 524. The second plain bearing end cap 553 in this embodiment, includes an outer surface 553a and an inner surface 553d. Inner surface 553d of second plain bearing end cap 553 forms plain bearing interface 552. The outer surface of the second plain bearing end cap 553 includes a first step portion 551b and a second step portion 551c both of reduced diameter in relation to the outer surface 553a. Step portion 551b engages a portion of the cage 506 and outer surface 551a engages a portion of the clutch cam housing 524.

Figure 20:
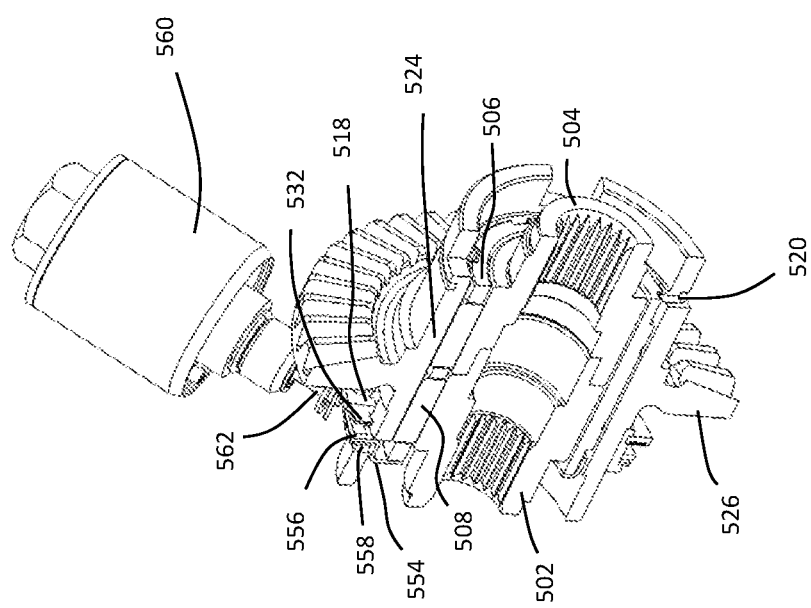
FIG. 20 is a side perspective cross-sectional view of the differential of FIG. 18 including an actuator with a plunger.
Figure 21:
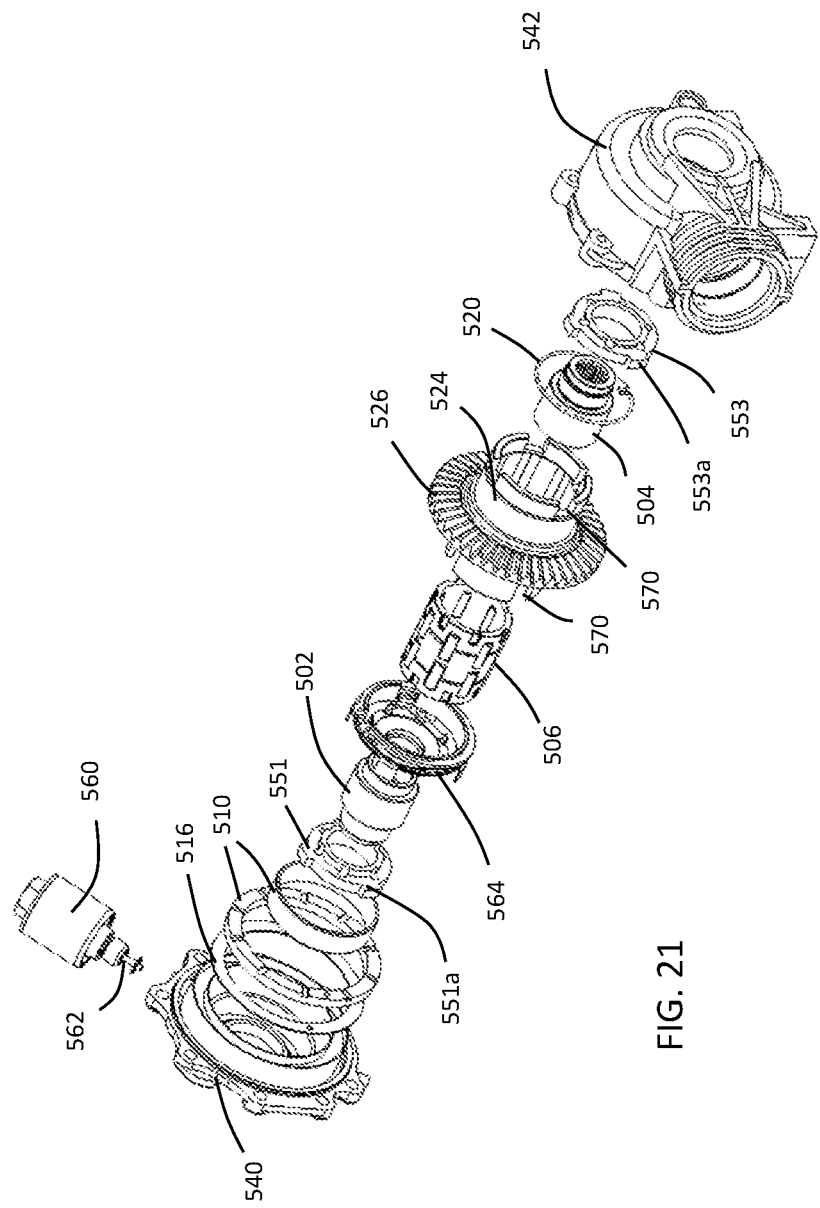
FIG. 21 is an exploded side perspective view of the differential of FIG. 18.

FIG. 20 is a side perspective cross-sectional view of the differential 500 illustrating an actuator 560 and a plunger 562. Further illustrated is a cage connector 554, washer 556 and drag assembly retainer 558. FIG. 21 is an exploded side perspective view of the differential 500. FIG. 21 illustrates plain bearing end caps 551 and 553. As illustrated, in this example the first and second plain bearing end caps 551 and 553 include radially extending engaging tabs 551a and 553a that are designed to be received in aperture windows 570 of the clutch cam housing 524. Also illustrated is the cage drag assembly 564.

Figure 23:
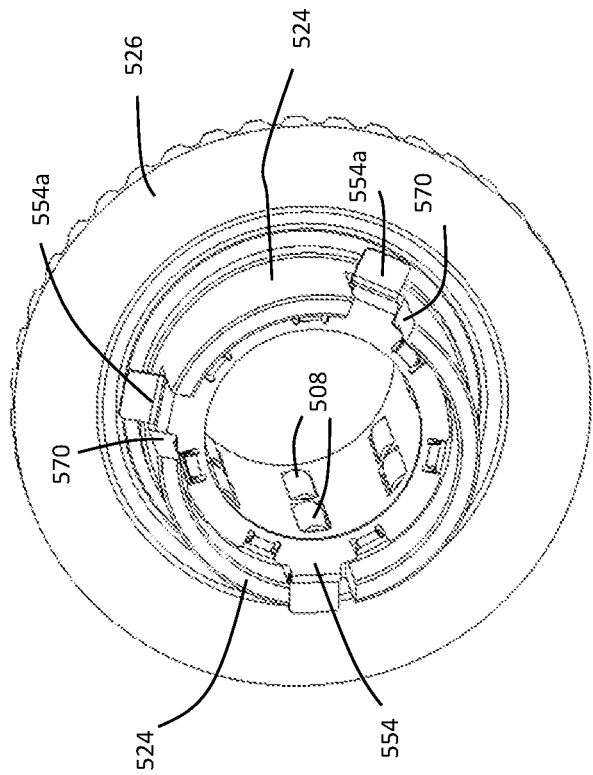
FIG. 23 is a side perspective view of a ring gear/clutch cam housing configuration according to one exemplary embodiment.
Figure 22:
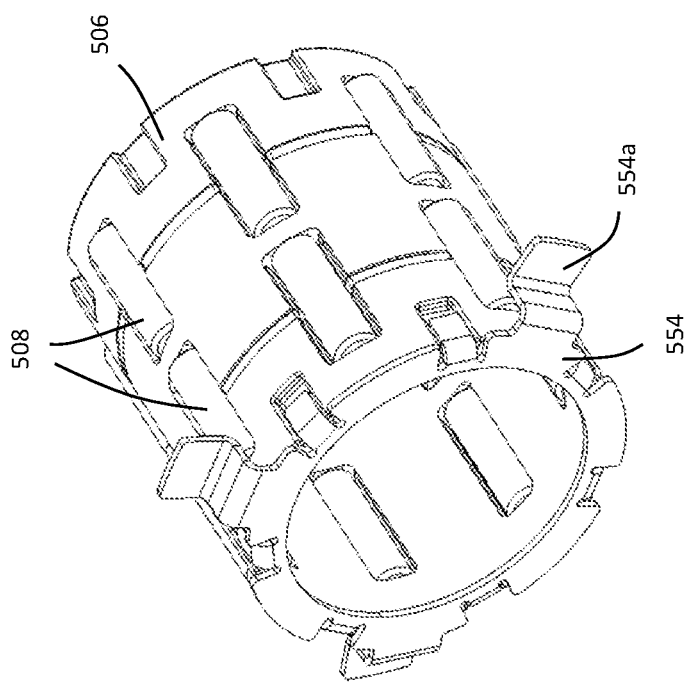
FIG. 22 is a side perspective view of a cage, cage connector and rollers according to one exemplary embodiment.

FIG. 22 is a side perspective view of the cage 506 and rollers 508 according to one exemplary embodiment. Also illustrated in FIG. 22 is the cage connector 554. The cage connector in this example embodiment includes engaging arms 554a. FIG. 23 is a side perspective view of the clutch cam housing 524 configuration of one exemplary embodiment illustrating the aperture windows 570 and the engaging arms 554a of the cage connector 554 received within respective aperture windows 570 in the clutch cam housing 524.

Figure 24:
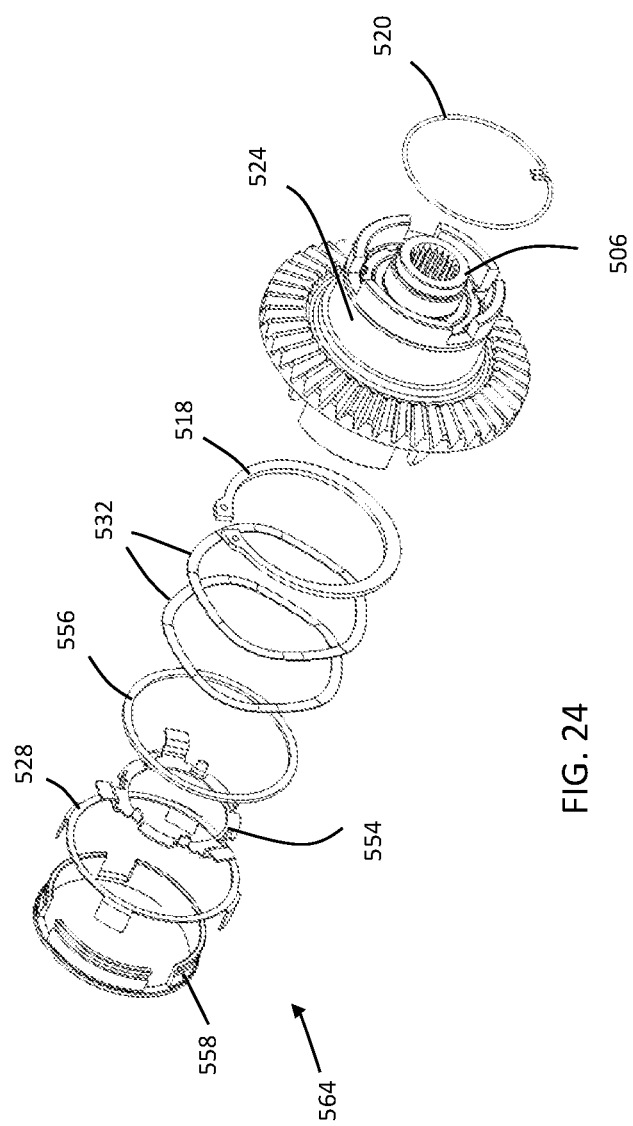
FIG. 24 is an exploded view of a drag assembly portion according to one exemplary embodiment.
Figure 26:
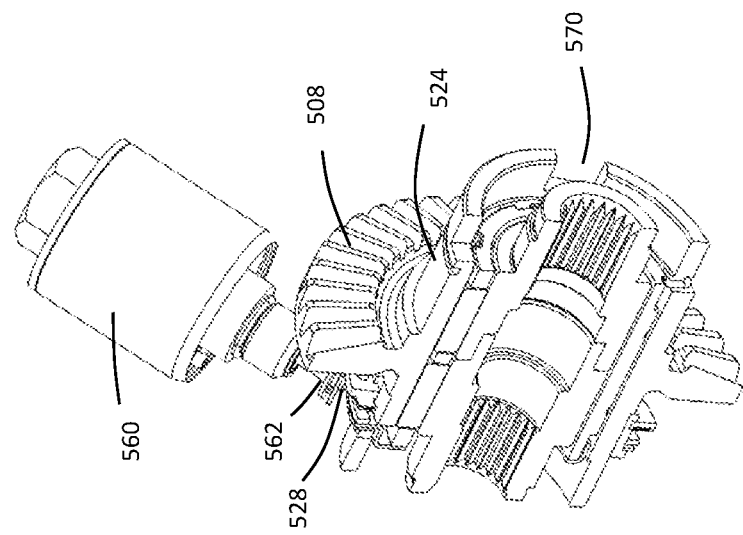
FIG. 26 is a side cross-sectional perspective view of the actuator engaging the drag plate according to one exemplary embodiment.
Figure 25:
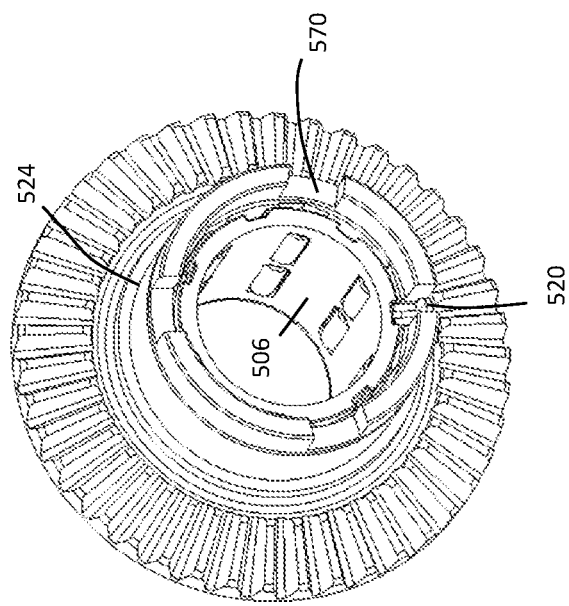
FIG. 25 is an end perspective view illustrating the cage and omega shaped torsion spring placement in relation to the clutch cam housing according to one exemplary embodiment.
Figure 27:
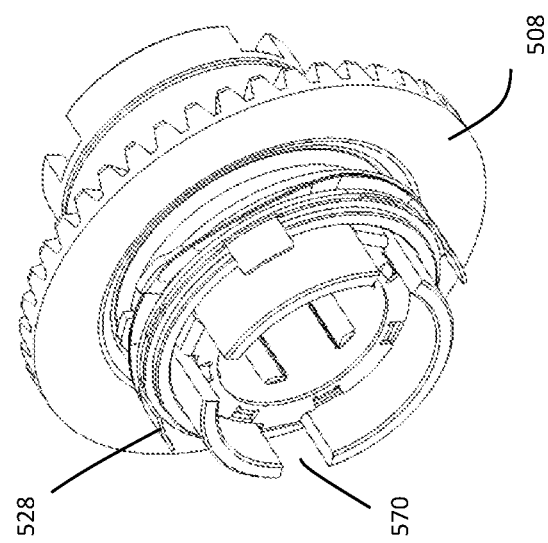
FIG. 27 is a side perspective view of the differential of FIG. 18 illustrating a drag plate according to one exemplary embodiment.

FIG. 24 is an exploded view of the cage drag assembly of one exemplary embodiment. The cage drag assembly in this example includes a drag assembly retainer 558, an engagement drag plate 528, the cage connector 554, washer 556, wave springs 532 and snap ring 518. Also illustrated in FIG. 24 is clutch cam housing 524 and omega spring 520 (centering spring). FIG. 25 is an end perspective view illustrating the cage 506 and centering spring 520 placement in relation to the clutch cam housing 524 of an embodiment. FIG. 26 is a side cross-sectional perspective view of the actuator 560 engaging the drag plate 528 in an embodiment. FIG. 27 is a side perspective view of the differential 500 illustrating the location of drag plate 528 in an embodiment.

Figure 28:
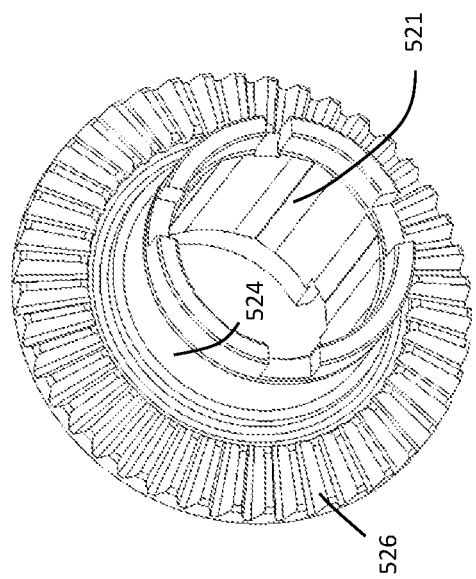
FIG. 28 is a side perspective of a ring gear and clutch cam housing of one embodiment.
Figure 29:
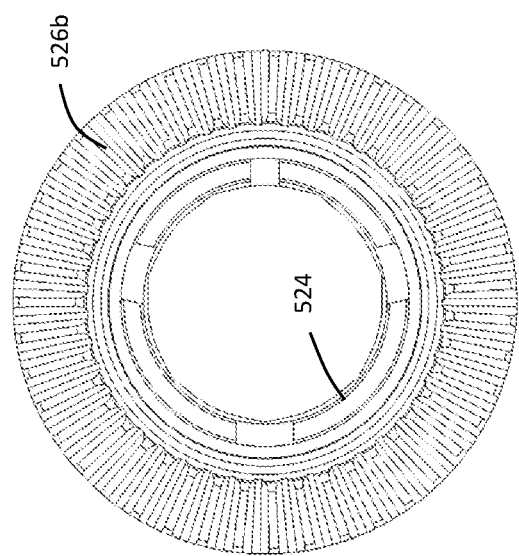
FIG. 29 is an end view of a ring gear and clutch cam housing according to one exemplary embodiment.

FIG. 28 is a side perspective of a ring gear 526 and clutch cam housing 524 of one embodiment and FIG. 29 is an end view of a ring gear 526 and clutch cam housing 524 of another embodiment. In one embodiment, the ring gear 526 and clutch cam housing 524 is one integrated piece and in another embodiment a two-piece configuration is used. FIG. 28 further illustrates the cam surface 521 formed in the inner surface of the clutch cam 524 in which the rollers 508 of the cage 506 engage and follow.

In operation, the first hub 502 and second hub 504 are operatively coupled to a vehicle front tires via half shafts, such as half shafts 622a and 622b of FIG. 30. The first hub 502 and the second hub 504 in an embodiment have a smooth cylindrical outer diameter surface. These two surfaces are operatively connected to the rollers 508 during the roller clutch engagement.

During engagement, cage 506 circumferentially locates and synchronizes the clutch rollers 508. The clutch cam housing 524 is operatively connected to the ring gear 526. The centering spring 520 provides a centering force between the clutch cam housing 524 and the clutch roller/cage assembly. When the clutch roller/cage assembly is centered, the rollers 508 cannot simultaneously be in contact with both the clutch cam housing 524 and a hub 502 or 504, and therefore torque is not transmitted from between the ring gear 526 and either of the vehicle's front tires.

The cage connector 554 is operatively connected to the cage 506 and is frictionally connected to both the engagement drag plate 528 and the washer 556. The cage connector 554 extends radially through the clutch cam housing 524 through the set of aperture windows 570 as illustrated in FIG. 23. Wave spring 532 provides an axial force at an installed height that is less than the spring free height by snap ring 518 and the shoulder feature on the drag assembly retainer 558 and thus provides a normal force to the cage connector 554 surfaces and engagement drag plate 528 and washer 556.

Engagement drag plate 528 is selectively prevented from rotating by a plunger 562 of an actuator 560 that extends from the case or cover 540. The actuator 560 is shown to be a linear solenoid capable of extending or retracting a rod (plunger 562) that in its extended position interferes with the rotation of the engagement drag plate 528.

With the plunger 562 in the extended position, preventing continuous rotation of the engagement drag plate 528, due to the axial force previously described, the resulting friction produces a torque on the cage connector 554. This torque is thus applied to the cage 506. As this torque exceeds the centering torque of the centering spring 520 (torque or centering spring), the cage rotates 506, moving the rollers 508 into the clutch cam housing 524 cam surface 521 and the first hub 502 and the second hub 504, resulting in an engaged position.

FIG. 30 is a block diagram of vehicle 600 that incorporates at least one differential 610 and/or 612 as described above. The vehicle includes a motor 602 to generate engine torque. The motor 602 may be an internal combustion engine, electrical motor or any other type of motor that supplies engine torque. The engine torque is communicated to a transmission 604. The transmission in turn is in rotational communication with differentials 610 and 612 via respective drive shafts 606 and 608. Differential 610 is in rotational communication with back wheels 630 via half shafts 620a and 620b. Differential 612 is in rotational communication with front wheels 630 via half shafts 622a and 622*b*. The vehicle 600 further includes at least one controller 605 configured to actuate the ORC assembly and BDMC assembly.

Controller logic may be executed by a microprocessor or a logical combination of mechanical switches selectively powering an ORC coil 129 or BDMC coil 260. The activation state may be determined by human user interface selection, throttle position, transmission gear selection, brake application, steering angle, engine speed, or wheel speed.

Further in general, the controller 605 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller 106 herein may be embodied as software, firmware, hardware or any combination thereof. The controller 605 may be part of a system controller or a component controller such as an engine controller or transmission controller. The controller 605 may include a memory. The memory may include computer-readable operating instructions that, when executed by the controller 605 provides functions to activate the ORC and BDMC assemblies. The computer readable instructions may be encoded within the memory. Memory is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

EXAMPLE EMBODIMENTS

Example 1 is a differential that includes a housing, a first side hub, a second side hub, a ring gear, a pinion gear, a roller cage assembly, a clutch cam housing, a centering biasing member, a first plain bearing end cap, a second plain bearing end cap and an overrunning clutch. The first and second side hubs are received within the housing. The ring gear is received within the housing. The pinion gear is in operational engagement with the ring gear. The pinion gear is configured to couple torque between the ring gear and a transmission. The roller cage assembly includes rollers that engage an outer surface of the first side hub and an outer surface of the second side hub. The clutch cam housing is received around the roller cage. The clutch cam housing is operationally coupled to the ring gear. The clutch cam housing further has an internal surface with cam features. The rollers of the roller cage assembly are positioned to engage the cam features in the interior surface of the clutch cam housing to selectively couple torque between the ring gear and the first and second side hubs. The centering biasing member is positioned to provide a centering force between the roller cage assembly and the clutch cam housing to center the rollers of the roller cage assembly in associated cam features in the interior surface of the clutch cam housing. The first plain bearing end cap has an interior surface that forms a plain bearing interface with an outer surface of the first side hub. The first plain bearing end cap further has a first outer surface portion that engages a first end portion of the roller cage assembly. The second plain bearing end cap has an interior surface that forms a plain bearing interface with an outer surface of the second side hub. The second plain bearing end cap further has a first outer surface portion that engages a second end portion of the roller cage assembly. The first and second plain bearing end caps support a positional location of the roller cage assembly. The overrunning clutch (ORC) assembly is configured to selectively engage the roller cage assembly during an ORC condition to provide a torsion force to overcome the centering force provided by the centering biasing member therein allowing the rollers of the roller cage assembly to move in the respective cam features in the interior surface of the clutch cam housing to selectively couple torque between the ring gear and the first and second side hubs.

Example 2 includes the differential of Example 1, wherein the ORC assembly further includes an ORC armature plate and an ORC electromagnetic coil that is configured to manipulate the ORC armature plate to engage the roller cage assembly during the ORC condition.

Example 3 includes the differential of any of the Examples 1-2, further including at least one controller configured to activate the ORC assembly.

Example 4 includes the differential of any of the Examples 1-3, further including a back-drive mode control assembly configured to selectively engage the roller cage assembly during a back-drive mode condition.

Example 5 includes the differential of Example 4, wherein the back-drive mode control assembly includes a back-drive mode armature plate and a back-mode electrical coil that is configured to manipulate the back-drive mode plate of engage the roller cage assembly during a back-drive mode condition.

Example 6 includes the differential of Example 4, further including at least one controller that is configured to activate the back-drive mode assembly.

Example 7 includes the differential of any of the examples 1-6, wherein the clutch cam housing further includes axially extending engaging portions. Ends of the centering biasing member engaging a pair of the axially extending engaging portions of the clutch cam housing.

Example 8 includes the differential of Example 7, wherein the roller cage assembly further includes an axially extending engaging tabs positioned to engage the ends of the centering biasing member.

Example 9 includes the differential of any of the examples 1-8, wherein the ORC assembly further includes a drag plate, a cage connector and an actuator. The cage connector is in operational engagement with the drag plate. The cage connector is further in operational engagement with the roller cage assembly. The actuator is configured to engage the drag plate to engage the ORC assembly.

Example 10 includes the differential of any of the examples 1-9, wherein the centering biasing member is further engaged with at least one of the housing, the clutch cam housing and the roller cage assembly in providing the centering force.

Example 11 includes the differential of any of the examples 1-10, wherein the first plain bearing end cap further having a second outer surface portion engaging an inner surface of a bearing.

Example 12 includes the differential of any of the examples 1-11, further wherein the first plain bearing has a second outer surface engaging a first end inner portion of the clutch cam assembly and the second plain bearing has a second outer surface portion engaging a second inner portion of the clutch cam assembly.

Example 13 includes a differential including a housing, a first side hub, a second side hub, a ring gear, a pinion gear, a roller cage, a clutch cam housing, a centering spring, a first plain bearing end cap, a second plain bearing end cap, an overrunning clutch (ORC) assembly and a back-drive mode control assembly. The first and second side hubs are received within the housing. The ring gear is received within the housing. The pinion gear is in operational engagement with the ring gear. The pinion gear is configured to couple torque between the ring gear and a transmission. The roller cage assembly includes rollers that engage an outer surface of the first side hub and an outer surface of the second side hub. The clutch cam housing is received around the roller cage. The clutch cam housing is operationally coupled to the ring gear. The clutch cam housing further has an internal surface with cam features. The rollers of the roller cage assembly are positioned to engage the cam features in the interior surface of the clutch cam housing to selectively couple torque between the ring gear and the first and second side hubs. The centering spring is positioned to provide a centering force between the roller cage assembly and the clutch cam housing to center the rollers of the roller cage assembly in associated cam features in the interior surface of the clutch cam housing. The first plain bearing end cap has an interior surface that forms a plain bearing interface with an outer surface of the first side hub. The first plain bearing end cap further has a first outer surface portion that engages a first end portion of the roller cage assembly. The second plain bearing end cap has an interior surface forming a plain bearing interface with an outer surface of the second side hub. The second plain bearing end cap further has a first outer surface portion that engages a second end portion of the roller cage assembly. The first and second plain bearing end caps support a positional location of the roller cage assembly. The ORC assembly is configured to selectively engage the roller cage assembly during an ORC condition to provide a torsion force to overcome the centering force of the centering spring allowing the rollers of the roller cage assembly to move in the respective cam features in the interior surface of the clutch cam housing to selectively couple torque between the ring gear and the first and second side hubs. The back-drive mode control assembly is configured to selectively engage the roller cage assembly during a back-drive mode condition.

Example 14 includes the differential of Example 13, wherein the clutch cam housing further includes axially extending engaging portions. Ends of the centering spring engage a pair of the axially extending engaging portions of the clutch cam housing.

Example 15 includes the differential of any of the Examples 13-14, wherein the roller cage assembly further includes axially extending engaging tabs positioned to engage the ends of the centering spring.

Example 16 includes the differential of any of the Examples 13-15, wherein the ORC assembly further includes a drag plate, a cage connector and an actuator. The cage connector is in operational engagement with the drag plate. The cage connector is further in operational engagement with the roller cage assembly. The actuator configured to engage the drag plate to engage the ORC assembly.

Example 17 includes the differential of any of the Examples 13-16, further wherein the first plain bearing has a second outer surface that engages a first end inner portion of the clutch cam assembly and the second plain bearing has a second outer surface portion that engages a second inner portion of the clutch cam assembly.

Example 18 includes a vehicle including motor, a transmission, a rear differential, a front differential and at least one controller. The motor provides engine torque. The transmission is in torsional communication with the motor. The rear differential is configured to selectively couple torque between the transmission and a pair of rear wheels. The front differential is configured to selectively couple torque between the transmission and a pair of front wheels. At least one of rear differential and the front differential includes a first side hub, a second side hub, a ring gear, a pinion gear, a roller cage, a clutch cam housing, a centering biasing member, a first bearing end cap, a second bearing end cap and an overrunning clutch (ORC) assembly. The first and second side hubs are received within the housing. The ring gear is received within the housing. The pinion gear is in operational engagement with the ring gear. The pinion gear is configured to couple torque between the ring gear and a transmission. The roller cage assembly includes rollers that engage an outer surface of the first side hub and an outer surface of the second side hub. The clutch cam housing is received around the roller cage. The clutch cam housing is operationally coupled to the ring gear. The clutch cam housing further has an internal surface with cam features. The rollers of the roller cage assembly are positioned to engage the cam features in the interior surface of the clutch cam housing to selectively couple torque between the ring gear and the first and second side hubs. The centering biasing member is positioned to provide a centering force between the roller cage assembly and the clutch cam housing to center the rollers of the roller cage assembly in associated cam features in the interior surface of the clutch cam housing. The first plain bearing end cap has an interior surface that forms a plain bearing interface with an outer surface of the first side hub. The first plain bearing end cap further has a first outer surface portion that engages a first end portion of the roller cage assembly. The second plain bearing end cap has an interior surface that forms a plain bearing interface with an outer surface of the second side hub. The second plain bearing end cap further has a first outer surface portion that engages a second end portion of the roller cage assembly. The first and second plain bearing end caps support a positional location of the roller cage assembly. The ORC assembly is configured to selectively engage the roller cage assembly during an ORC condition to provide a torsion force to overcome the centering force provided by the centering biasing member therein allowing the rollers of the roller cage assembly to move in the respective cam features in the interior surface of the clutch cam housing to selectively couple torque between the ring gear and the first and second side hubs. The at least one controller is configured to activate the ORC assembly during an ORC condition.

Example 19 includes the vehicle of Example 18 further including a back-drive mode control assembly that is configured to selectively engage the roller cage assembly during a back-drive mode condition. The at least one controller configured to activate the back-drive mode control assembly.

Example 20 includes the vehicle of any of the Examples 18-19, further wherein the clutch cam housing further includes axially extending engaging portions. Ends of the centering spring engage a pair of the axially extending engaging portions of the clutch cam housing. The roller cage assembly further includes axially extending engaging tabs positioned to engage the ends of the centering biasing member.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A differential comprising:
a housing;
a first side hub;
a second side hub, the first and second side hubs received within the housing;
a ring gear received within the housing;
a pinion gear in operational engagement with the ring gear, the pinion gear configured to couple torque between the ring gear and a transmission;
a roller cage assembly including rollers that engage an outer surface of the first side hub and an outer surface of the second side hub;
a clutch cam housing received around the roller cage, the clutch cam housing operationally coupled to the ring gear, the clutch cam housing further having an interior surface with cam features, the rollers of the roller cage assembly positioned to engage the cam features in the interior surface of the clutch cam housing to selectively couple torque between the ring gear and the first and second side hubs;
a centering biasing member positioned to provide a centering force between the roller cage assembly and the clutch cam housing to center the rollers of the roller cage assembly in associated cam features in the interior surface of the clutch cam housing;
a first plain bearing end cap having an interior surface forming a plain bearing interface with an outer surface of the first side hub, the first plain bearing end cap further having a first outer surface portion that engages a first end portion of the roller cage assembly;
a second plain bearing end cap having an interior surface forming a plain bearing interface with an outer surface of the second side hub, the second plain bearing end cap further having a first outer surface portion that engages a second end portion of the roller cage assembly, wherein the first and second plain bearing end caps support a positional location of the roller cage assembly; and
an overrunning clutch (ORC) assembly configured to selectively engage the roller cage assembly during an ORC condition to provide a torsion force to overcome the centering force provided by the centering biasing member therein allowing the rollers of the roller cage assembly to move in the respective cam features in the interior surface of the clutch cam housing to selectively couple torque between the ring gear and the first and second side hubs.

2. The differential of claim 1, wherein the ORC assembly further comprises:
an ORC armature plate; and
an ORC electromagnetic coil configured to manipulate the ORC armature plate to engage the roller cage assembly during the ORC condition.

3. The differential of claim 1, further comprising:
at least one controller configured to activate the ORC assembly.

4. The differential of claim 1, further comprising:
a back-drive mode control assembly configured to selectively engage the roller cage assembly during a back-drive mode condition.

5. The differential of claim 4, wherein the back-drive mode control assembly includes:
a back-drive mode armature plate; and
a electromagnetic coil configured to manipulate the back-drive mode armature plate to engage the roller cage assembly during a back-drive mode condition.

6. The differential of claim 4, further comprising:
at least one controller configured to activate the back-drive mode assembly.

7. The differential of claim 1, wherein the clutch cam housing further comprising:
axially extending engaging portions, ends of the centering biasing member engaging a pair of the axially extending engaging portions of the clutch cam housing.

8. The differential of claim 7, wherein the roller cage assembly further comprising:
axially extending engaging tabs positioned to engage the ends of the centering biasing member.

9. The differential of claim 1, wherein the ORC assembly further comprises:
a drag plate;
a cage connector in operational engagement with the drag plate, the cage connector further in operational engagement with the roller cage assembly; and
an actuator, the actuator configured to engage the drag plate to engage the ORC assembly.

10. The differential of claim 1, wherein the centering biasing member is further engaged with at least one of the housing, the clutch cam housing and the roller cage assembly in providing the centering force.

11. The differential of claim 1, wherein the first plain bearing end cap further having a second outer surface portion engaging an inner surface of a bearing.

12. The differential of claim 1, further wherein:
the first plain bearing end cap having a second outer surface engaging a first end inner portion of the clutch cam housing; and
the second plain bearing end cap having a second outer surface portion engaging a second inner portion of the clutch cam housing.

13. A differential comprising:
a housing;
a first side hub;
a second side hub, the first and second side hubs received within the housing;
a ring gear received within the housing;
a pinion gear in operational engagement with the ring gear, the pinion gear configured to couple torque between the ring gear and a transmission;
a roller cage assembly including rollers that engage an outer surface of the first side hub and an outer surface of the second side hub;
a clutch cam housing received around the roller cage, the clutch cam housing operationally coupled to the ring gear, the clutch cam housing further having an interior surface with cam features, the rollers of the roller cage assembly positioned to engage the cam features in the interior surface of the clutch cam housing to selectively couple torque between the ring gear and the first and second side hubs;

a centering spring positioned to provide a centering force between the roller cage assembly and the clutch cam housing to center the rollers of the roller cage assembly in associated cam features in the interior surface of the clutch cam housing;

a first plain bearing end cap having an interior surface forming a plain bearing interface with an outer surface of the first side hub, the first plain bearing end cap further having a first outer surface portion that engages a first end portion of the roller cage assembly;

a second plain bearing end cap having an interior surface forming a plain bearing interface with an outer surface of the second side hub, the second plain bearing end cap further having a first outer surface portion that engages a second end portion of the roller cage assembly, wherein the first and second plain bearing end caps support a positional location of the roller cage assembly;

an overrunning clutch (ORC) assembly configured to selectively engage the roller cage assembly during an ORC condition to provide a torsion force to overcome the centering force of the centering spring allowing the rollers of the roller cage assembly to move in the respective cam features in the interior surface of the clutch cam housing to selectively couple torque between the ring gear and the first and second side hubs; and a back-drive mode control assembly configured to selectively engage the roller cage assembly during a back-drive mode condition.

14. The differential of claim 13, wherein the clutch cam housing further comprising:

axially extending engaging portions, ends of the centering spring engaging a pair of the axially extending engaging portions of the clutch cam housing.

15. The differential of claim 14, wherein the roller cage assembly further comprising:

axially extending engaging tabs positioned to engage the ends of the centering spring.

16. The differential of claim 13, wherein the ORC assembly further comprises:

a drag plate;

a cage connector in operational engagement with the drag plate, the cage connector further in operational engagement with the roller cage assembly; and an actuator, the actuator configured to engage the drag plate to engage the ORC assembly.

17. The differential of claim 13, further wherein:

the first plain bearing end cap having a second outer surface engaging a first end inner portion of the clutch cam housing; and the second plain bearing end cap having a second outer surface portion engaging a second inner portion of the clutch cam housing.

18. A vehicle comprising:

a motor to provide engine torque;

a transmission in torsional communication with the motor;

a rear differential configured to selectively couple torque between the transmission and a pair of rear wheels;

a front differential configured to selectively couple torque between the transmission and a pair of front wheels;

at least one of rear differential and the front differential including, a first side hub, a second side hub, the first and second side hubs received within a housing;

a ring gear received within the housing, a pinion gear in operational engagement with the ring gear, the pinion gear configured to couple torque between the ring gear and a transmission, a roller cage assembly including rollers that engage an outer surface of the first side hub and an outer surface of the second side hub, a clutch cam housing received around the roller cage, the clutch cam housing operationally coupled to the ring gear, the clutch cam housing further having an interior surface with cam features, the rollers of the roller cage assembly positioned to engage the cam features in the interior surface of the clutch cam housing to selectively couple torque between the ring gear and the first and second side hubs, a centering biasing member positioned to provide a centering force between the roller cage assembly and the clutch cam housing to center the rollers of the roller cage assembly in associated cam features in the interior surface of the clutch cam housing, a first plain bearing end cap having an interior surface forming a plain bearing interface with an outer surface of the first side hub, the first plain bearing end cap further having a first outer surface portion that engages a first end portion of the roller cage assembly, a second plain bearing end cap having an interior surface forming a plain bearing interface with an outer surface of the second side hub, the second plain bearing end cap further having a first outer surface portion that engages a second end portion of the roller cage assembly, wherein the first and second plain bearing end caps support a positional location of the roller cage assembly, and an overrunning clutch (ORC) assembly configured to selectively engage the roller cage assembly during an ORC condition to provide a torsion force to overcome the centering force provided by the centering biasing member therein allowing the rollers of the roller cage assembly to move in the respective cam features in the interior surface of the clutch cam housing to selectively couple torque between the ring gear and the first and second side hubs; and at least one controller configured to activate the ORC assembly during an ORC condition.

19. The vehicle of claim 18, further comprising:

a back-drive mode control assembly configured to selectively engage the roller cage assembly during a back-drive mode condition, the at least one controller configured to activate the back-drive mode control assembly.

20. The vehicle of claim 18 further wherein:

the clutch cam housing further including axially extending engaging portions, ends of the centering biasing member engaging a pair of the axially extending engaging portions of the clutch cam housing; and the roller cage assembly further including axially extending engaging tabs positioned to engage the ends of the centering biasing member.

\* \* \* \* \*